United States Patent [19]

Anderson

[11] 4,153,943
[45] May 8, 1979

[54] HIGH SPEED I/O FOR CONTENT ADDRESSABLE TYPE MEMORIES

[75] Inventor: George A. Anderson, Minneapolis, Minn.

[73] Assignee: Honeywell Inc., Minneapolis, Minn.

[21] Appl. No.: 824,007

[22] Filed: Aug. 12, 1977

[51] Int. Cl.² .................. G06F 13/00; G06F 3/00
[52] U.S. Cl. .................. 364/900; 365/49; 179/18 GE
[58] Field of Search ... 364/200 MS File, 900 MS File; 365/49, 50, 89; 179/18 GE, 18 GF, 1 SW; 307/12; 340/166 R

[56] References Cited

U.S. PATENT DOCUMENTS

| | | | |
|---|---|---|---|
| 3,546,684 | 12/1970 | Maxwell et al. | 364/900 |
| 3,699,525 | 10/1972 | Klavins | 364/200 |
| 3,863,233 | 1/1975 | Eddey et al. | 365/50 |
| 4,004,283 | 1/1977 | Bennett et al. | 364/200 |
| 4,048,673 | 9/1977 | Hendrie et al. | 364/200 |
| 4,064,489 | 12/1977 | Babb | 364/200 |

OTHER PUBLICATIONS

Motorla M6800 Microprocessor Application Manual, 1975, pp. 1-1-5,7-9;3-1,2,8-20;4-38,39,40,41,42.

Primary Examiner—Mark E. Nusbaum
Attorney, Agent, or Firm—Henry L. Hanson

[57] ABSTRACT

A multiple path input/output switching circuit particularly adapted for use with a serially accessed content addressable memory where several simultaneous data transfers may be carried out between the memory and a host system.

7 Claims, 39 Drawing Figures ( ECAM ARRAY CIRCUIT BOARD )

(ECAM HYBRID CIRCUIT MODULE)

FIG. 14
(MATCH MANIPULATION FUNCTIONS)

MATCH MEMORY

| | |
|---|---|
| MATCH MEMORY TO MATCH BIT | $(m \leftarrow MMi)$ |
| MATCH MEMORY TO STORAGE | $(L \leftarrow MMi)$ |
| STORAGE TO MATCH MEMORY | $(MMi \leftarrow L)$ |
| MATCH BIT TO MATCH MEMORY | $(MMi \leftarrow m)$ |

BOOLEAN

| | |
|---|---|
| AND | $(m \leftarrow m \cdot T)$ |
| OR | $(m \leftarrow m + T)$ |
| EXCLUSIVE OR | $(m \leftarrow m \oplus T)$ |
| COMPLEMENT m | $(m \leftarrow \overline{m})$ |
| EXCHANGE | $(m \leftrightarrow T)$ |
| COPY | $(T \leftarrow m)$ |
| COMPLEMENT T | $(T \leftarrow \overline{T})$ |

INITIALIZE

| | |
|---|---|
| INITIALIZE m | $(m \leftarrow G)$ |
| INITIALIZE T | $(T \leftarrow G)$ |

I/O AND MMR CONTROL FUNCTIONS

ZERO HYBRID INTERFACE REGISTER
LOAD HYBRID INTERFACE REGISTER
CAPTURE CARRY
REPORT CARRY
REPORT MATCHES

MULTIPLE MATCH RESOLVER FUNCTIONS

| | |
|---|---|
| SELECT FIRST | $m \leftarrow P$ (slow) |
| SELECT FIRST SET | $m \leftarrow P$ (fast) |
| DISCARD FIRST | $m \leftarrow m \cdot \overline{P}$ (slow) |
| DISCARD FIRST SET | $m \leftarrow m \cdot \overline{P}$ (fast) |

MATCH STATE INFORMATION TRANSFERS

| FUNCTION | TRANSFER | CONTROL |
|---|---|---|
| $m \leftarrow MM_i$ | | $T = 1$ |
| $L \leftarrow MM_i$ | | $T = 0$ |
| $MM_i \leftarrow L$ | | $T = 0$ |
| $MM_i \leftarrow m$ | | $T = 1$ |

DATA PROCESSING FUNCTIONS

ADD / SUBTRACT
REVERSE SUBTRACT
ARITHMETIC COMPARE
MIN / MAX

INPUT / OUTPUT FUNCTIONS

INPUT
OUTPUT
FLAG DUPLICATES

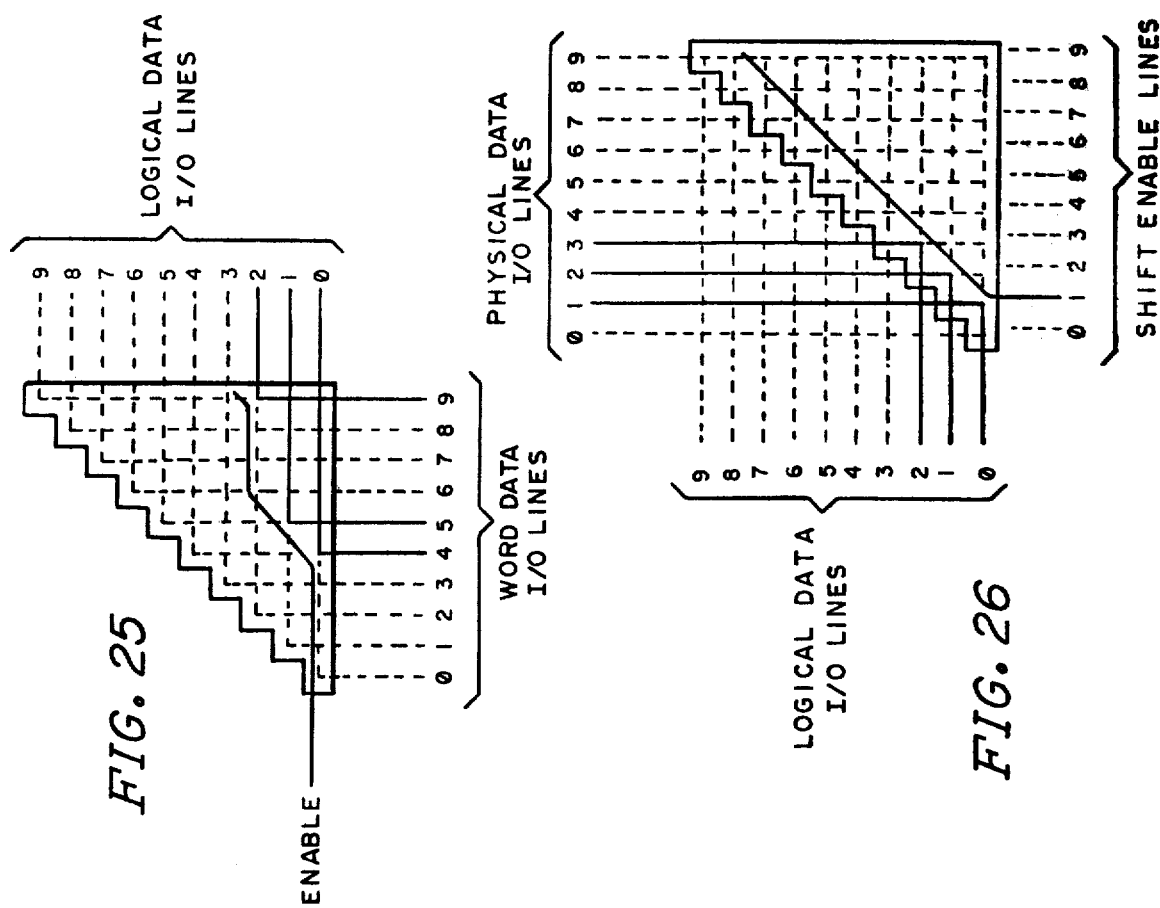

HIGH SPEED I/O FOR CONTENT ADDRESSABLE TYPE MEMORIES

Reference is hereby made to my co-pending applications "Content Addressable Memory," Ser. No. 824,011 and "Triangular High Speed I/O System for Content Addressable Memories," Ser. No. 824,012 which were filed on even date herewith and are assigned to the same assignee as the present application.

BACKGROUND OF THE INVENTION

The present invention relates to an input/output switch apparatus for data storage and processing devices and systems. In particular, the present invention is directed to such a switch apparatus which is useful with content addressable or associative memories.

A content addressable or associative memory is a device which stores information. When a central control broadcasts information, the content addressable memory compares the information which it has stored with the broadcast information and indicates whether there is agreement or disagreement between the two.

Content addressable memories were first proposed in the 1950's. Since that time, they have been discussed extensively in the literature. In recent years, commercially available content addressable memories have appeared. A detailed description of the operation and features of content addressable memories and parallel processors is contained in a book by Caxton C. Foster, "Content Addressable Parallel Processors" (1976). Patents describing content addressable memories and parallel processors include U.S. Pat. Nos. 3,245,052 (Lewin); 3,387,274 (David); 3,540,002 (Clapper); 3,588,845 (Ling); 3,648,254 (Beausoleil); 3,681,762 (Minshull et al); 3,729,718 (Dufton et al); 3,913,075 (Vitalieu et al); 3,936,806 (Batcher); and 3,970,993 (Finnila).

The requirement for content addressable memories and parallel processors stems from the inherent performance limitations in conventional data base approaches.

In contrast to conventional techniques, content addressable memories have the capability of retrieving information directly, based on the attributes of the data itself. This is accomplished by including sufficient processing capability in the data storage medium to perform searching operations. As greater search and retrieval capability is provided in the memory circuits, there is an ever increasing need for greater capability in the input and output circuitry coupling the memory apparatus to the host system. In serial types of content addressable memories, the input/output (I/O) from each word is constrained by the hardware to be serial also. Such an I/O is a performance limitation in a content addressable memory having parallel addressing capabilities and, as in the memory described here, where multiple address locations are likely to be selected in any search of the memory stored data base, there is a need for a fast transfer of the data to or from the host system.

In the extended capability content addressable memory (ECAM) described herein, the access to the stored data words is serial. The normal approach to handling a word transfer would be with a word parallel I/O except for the fact that the transfer rate potential of a word parallel bus cannot be sustained by the serial data available at a single word. Another approach would involve the physical partitioning of the ECAM into subsystems, each with their own I/O circuit logic. This has been found to introduce undue complexity in the control software and also to be subject to the problem of having all the searched-for data located in one subsystem which means the transfer from that subsystem will be the limiting factor on the transfer rate.

To overcome the limitations of the known options available for input/output transfers, the present apparatus has been provided to work in combination with the basic logic of the ECAM to select several words for simultaneous input/output transfers relative to the ECAM.

SUMMARY OF THE INVENTION

The input/output switching apparatus of the present invention provides for the simultaneous serial transfer of a plurality of selected data words relative to a content addressable memory. The switching function is achieved by controlled logic circuits which will select a variable number of data words for serial transfer in accordance with the number of data words requiring transfer, up to the maximum number of input/output lines provided in the basic I/O system organization.

BRIEF DESCRIPTION OF THE DRAWINGS

FIG. 14 shows match manipulation functions performed by the word logic block.

FIGS. 25 and 26 show the selector and shifter matrices of the I/O swithc of FIG. 24.

FIG. 27 illustrates the I/O switch mode control.

DETAILED DESCRIPTION OF THE PREFERRED EMBODIMENTS

I. ECAM System Overview

In a preferred embodiment, the present invention is an extended capability content addressable memory (ECAM) which is designed specifically for high performance data base applicaions. The ECAM is a special purpose machine designed to be attached to one or more host computers and to be used as an access processor for the data base it contains.

Figure 1:
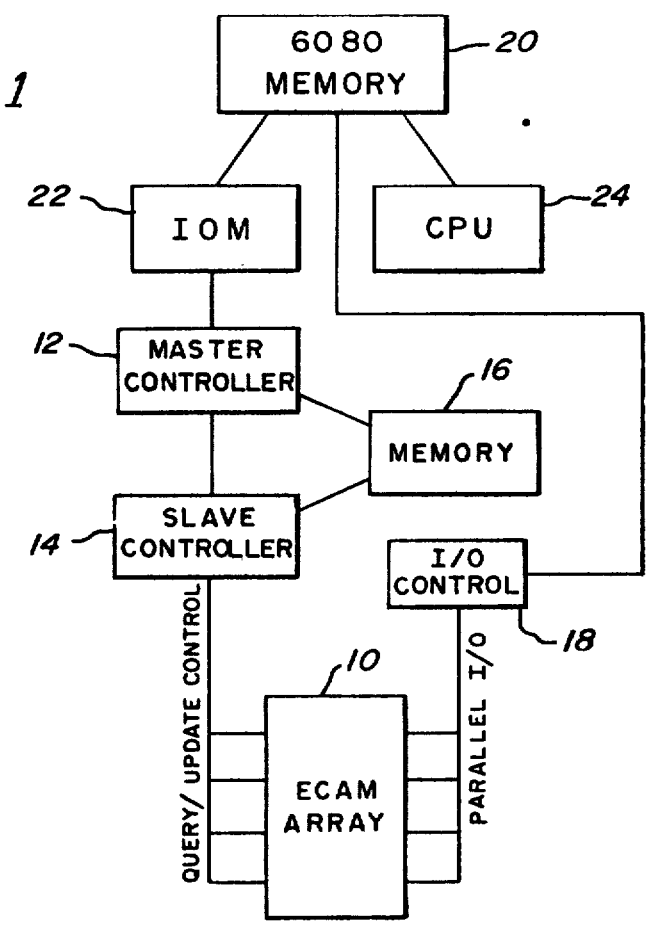
FIG. 1 is a system level block diagram of an extended content-addressable memory (ECAM).

A system level block diagram of the ECAM is shown in FIG. 1. The machine is divided into two major portions: ECAM array 10, and a control unit formed by master controller 12, slave controller 14, memory 16, and input/output control 18. As shown in FIG. 1, the ECAM is used in conjunction with a host computer such as a Honeywell #6080 computer. FIG. 1 shows the 6080 memory 20, Input/Output Multiplexor (IOM) 22, and Central Processing Unit (CPU) 24 of the H6080 computer.

The main unit within the control unit is master controller 12, which is preferrably a minicomputer. Its memory bus provides the basic structure of the controller unit, and the availability of standard software facilitates writing of application code to mediate between the host unit and slave controller 14. In one preferred embodiment of the present invention, master controller 12 is a PDP-11/45, although other minicomputers allowing direct memory access (DMA) can also be used.

Slave controller 14 directs the operation of ECAM array 10. In one preferred embodiment, slave controller 14 includes a high speed microprogrammed interpreter which is designed specifically for interpretatively executing a block-structured guery language used to specify ECAM operation sequences. Query language sequences are passed from the master 12 to slave 14 via buffers in memory 16. The control store of the interpreter of slave controller 14 is writable, allowing easy changes to the query language. The output of the interpreter is a stream of array primative operations which are passed to an interation control unit via dedicated buffers within slave controller 14. The interation control is a hard wired subunit which generates control signal sequences to effect ECAM array operations.

Figure 2:
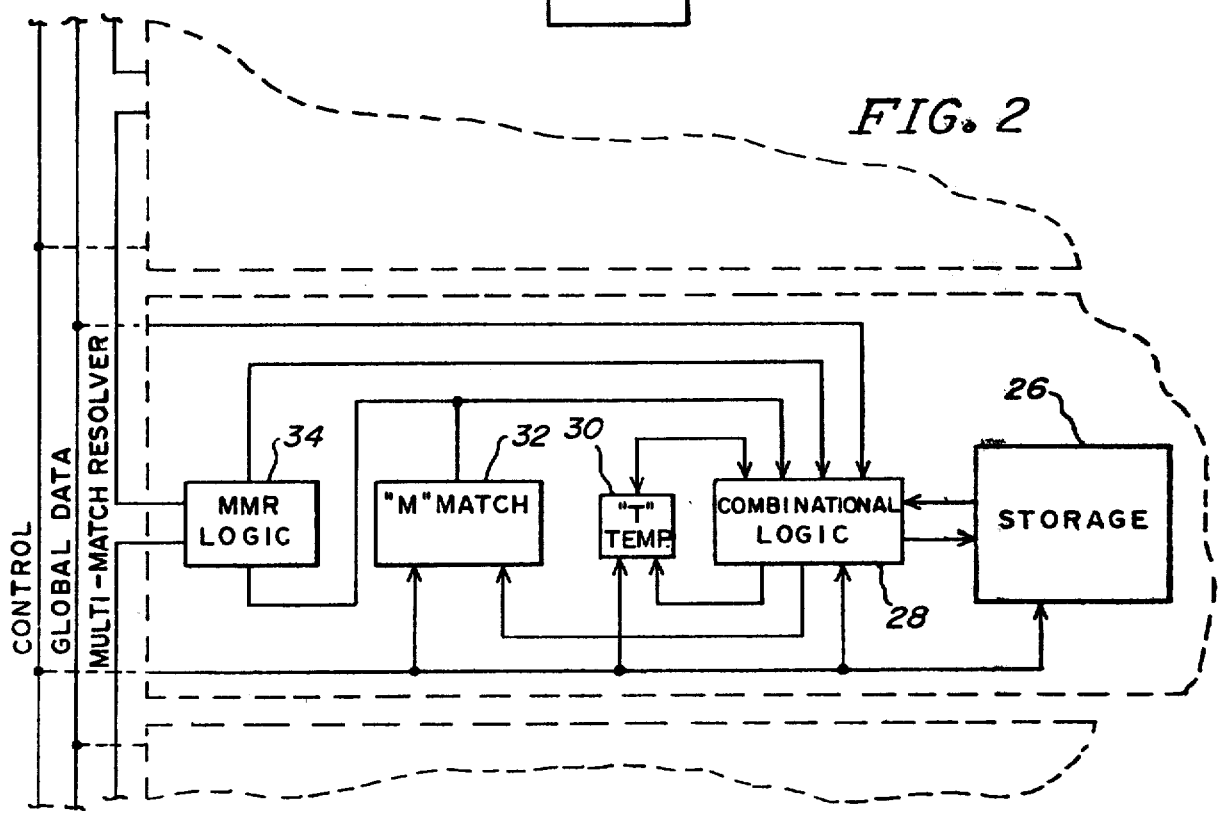
FIG. 2 shows a typical ECAM associative word.

ECAM array 10 consists of a large number of associative words such as shown in FIG. 2. Each associative word consists of data store 26 and associated "word logic" which supports the content addressing and associative functions of the array. The word logic includes combinational logic 28, temporary store 30, M-bit match memory 32, and multiple match resolver logic 34.

The two major elements of the word logic are match memory 32 and combination logic 28. Word logic operations such as searches and arithmetic, are performed by selecting one of the M match bits from match memory 32 and repeatedly executing a sequence of combinational operations on each bit of a field within the storage word stored in data storage 26. For most operations, the inputs to the combinational logic 28 are the selected match bit, a "global" data signal from the control unit and the "local" data bit from the storage 26.

The word logic shown in FIG. 2 differs from conventional content addressable memory designs in that it uses "non-dedicated" storage rather than "dedicated" storage. In previous content addressable memory designs, there are both combinational logic and storage flip-flops provided on a per word basis, with the storage flip-flops being dedicated to specific functions. For example, in one typical content addressable memory, a "Search Results" flip-flop is used during matching operations and a "Word Select Register" flip-flop is used for temporary storage. In addition to primary uses, the flip-flops can also be set and reset as functions of each other, regardless of the match or I/O status of the word.

The organization shown in FIG. 2 is superior to the prior art dedicated storage approach for both implementation and functional reasons. In FIG. 2, all but one bit of storage within the word logic is organized into M bit match memory 32 which is addressed by the system control logic as part of the control function. From a functionality standpoint, this is an improvement over the dedicated form, because any of the storage locations within match memory 32 may be used for any function, including functions not envisioned by the designer when the word logic is originally designed. Because only one block of logic is provided, rather than logic associated with each individual flip-flop, and because all operations use combinational logic 28, the logic of combinational logic 28 can be generalized to include most if not all Boolean functions required by typical system algorithms and, in addition, a general set of operations can be included as building blocks for as yet unknown algorithms. The cost of such extended functionality would be excessive in the prior art dedicated organization.

In addition to the data storage and word logic, the ECAM array also includes a high speed I/O path. In a preferred embodiment, the high speed I/O path allows many words to be logically selected to participate simultaneously in a single input or output operation. The I/O switch which implements this fast I/O mode can be included at the word logic level.

Prior to describing the embodiment in detail, we will first describe the application of this device to the employee data base problem described previously. Use in this application would require that the extended content addressable memory (ECAM) provide five general categories of operation; initialization, record insertion, search, record output and record deletion. Operations between the host computer and the master portion of the ECAM controller would be in terms of these categories. Software in the master controller would then specify the operations in terms of the query language, which would in turn interpret the masters commands and generate control signals to the ECAM array.

The first operation in setting up the employee data base would be to "initialize" the system. Assuming this application to be the sole use of the ECAM, receipt of this command from the host would cause the ECAM to mark a bit of every word to indicate that the word was "empty" and available for record storage. In conventional CAMs, this bit would be a 'tag' and contained in the data storage means. In the ECAM, it would normally be one of the M match bits.

Once the initialization had been performed, the host would proceed to "insert" each of the records comprising the data base. Each insertion would involve the following operations:
1. Search the ECAM to find all words which are marked "empty". (N.B., for the first insertion, this operation would select all words.)
2. Use the Multiple-Match Resolver (MMR) to select one of the matching words.
3. Write the new record into the selected word.
4. Change the marking of the word to indicate that it is "full".

This insertion sequence would be repeated for each of the records of the data base.

Once the data base had been entered, search operations could be performed. These would follow the general scheme as follows:
1. Select (match) all words which are not empty.
2. Using one of the match bits in each, evaluate all words with respect to the first search criterion.
3. Repeat step 2 for each of the search criteria, performing logical combinations of the match bits as specified by the interaction of the criteria.
   (N.B., this need for combinations on simple searches is the reason that several match bits are required.
   For example, a search for all employees who are "under 40, or married, and in the sales department" might require as many as 3 match bits during evaluation.)

The result of a search operation is always a certain status of the ECAM, as indicated by the state of the match bits.

Once this state is established, the host may read or write the selected subset of records, using the MMR as required to select individual records.

To delete a record, a search is made to uniquely identify it, then the occupancy bit for the matched word is changed to indicate "empty". No other operations are required.

The remainder of this section discusses the hardware of the ECAM in detail, describing the hardware required to implement the above classes of operations.

II. ECAM ARRAY OVERVIEW

As described in the previous section, the ECAM array consists of data storage, word logic, and input/output (I/O) hardware that is used in the ECAM system to perform high speed processing of large data base files (e.g., 600 million bits). ECAM array operation is directed by the microprogrammed slave controller 14 which was described previously.

This section provides a general overview of the ECAM array and its operation. This overview is a top down description of the array and includes some of the physical characteristics.

Later sections will present a bottom up view of the ECAM array. Each functional level of the array will be described, beginning with the word logic block on continuing through the hybrid and board levels, and ending with cabinet level control. The descriptions are detailed, providing register level design and operation. When required, procedures for proper use (control sequence) are also provided.

Figure 3:
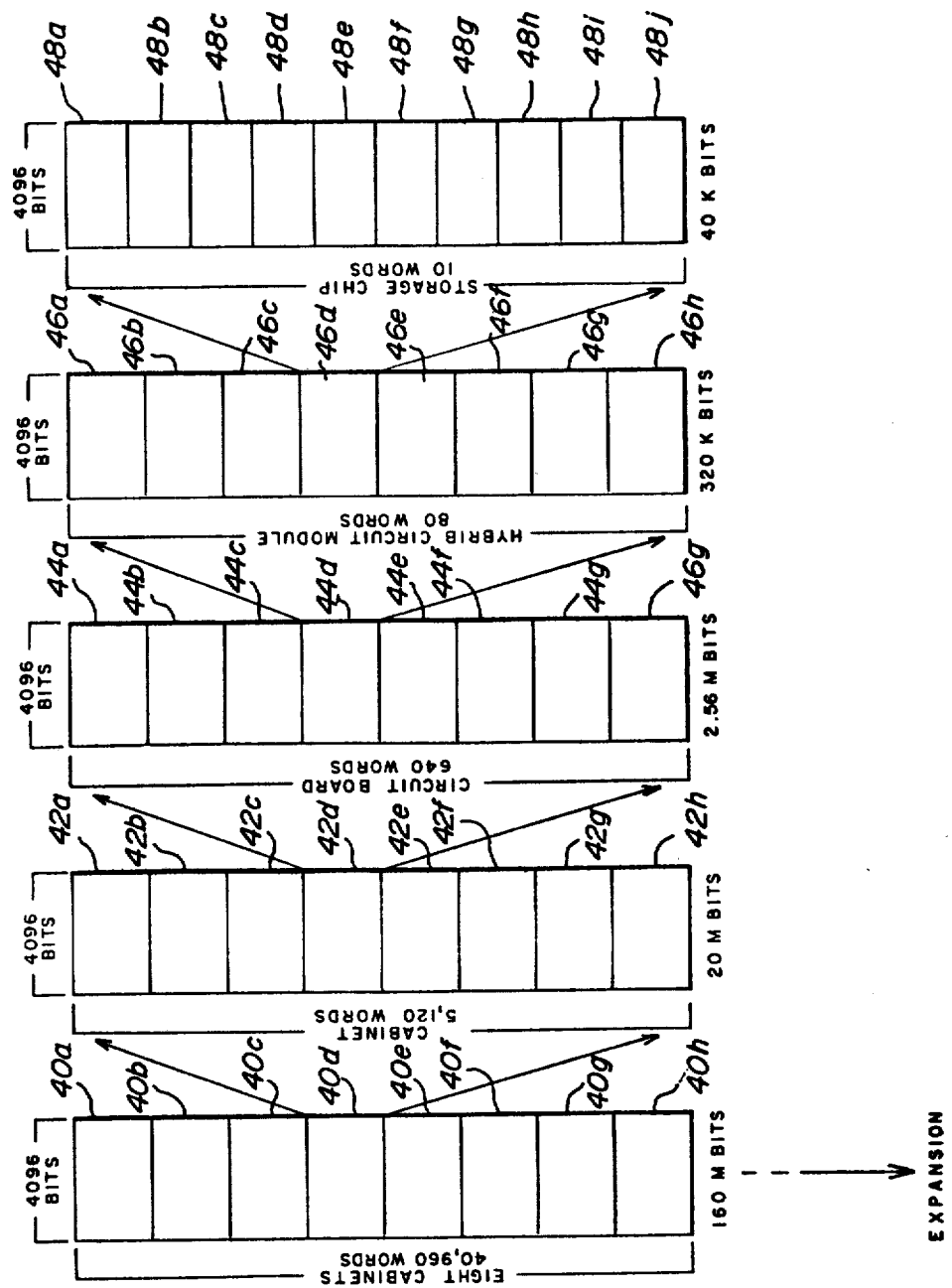
FIG. 3 shows ECAM array organization and structure.

In this overview, a specific ECAM array design is presented. FIG. 3 shows the array organization and structure. The array is housed in eight cabinets 40a-40h. The basic eight cabinet array provides storage and processing for over 160 million bits of information. The array may be expanded by the simple expedient of adding cabinets to accommodate over 640 million bits.

The storage of the eight-cabinet array is organized as 40,960 words with each word containing 4,096 bits. Each cabinet 40 has a storage capacity of over 20 million bits. It contains the following equipment: eight storage/word logic circuit bits; a signal distribution, cabinet logic circuit board; a back panel, cable interface, and external connector assembly; modular power supply; and a cooling system consisting of fans for the power supply and fans/ducting for the circuit boards. The cabinet 40 is the basic expansion element by which the ECAM array can grow.

As shown in FIG. 3, each cabinet 40 includes eight circuit boards 42a-42h. Each circuit board, in turn, includes eight hybrid circuit modules 44a-44h. Eight storage chips 46a-46h are contained in each hybrid circuit module 44, and each storage chip includes ten words 48a-48h.

Figure 4:
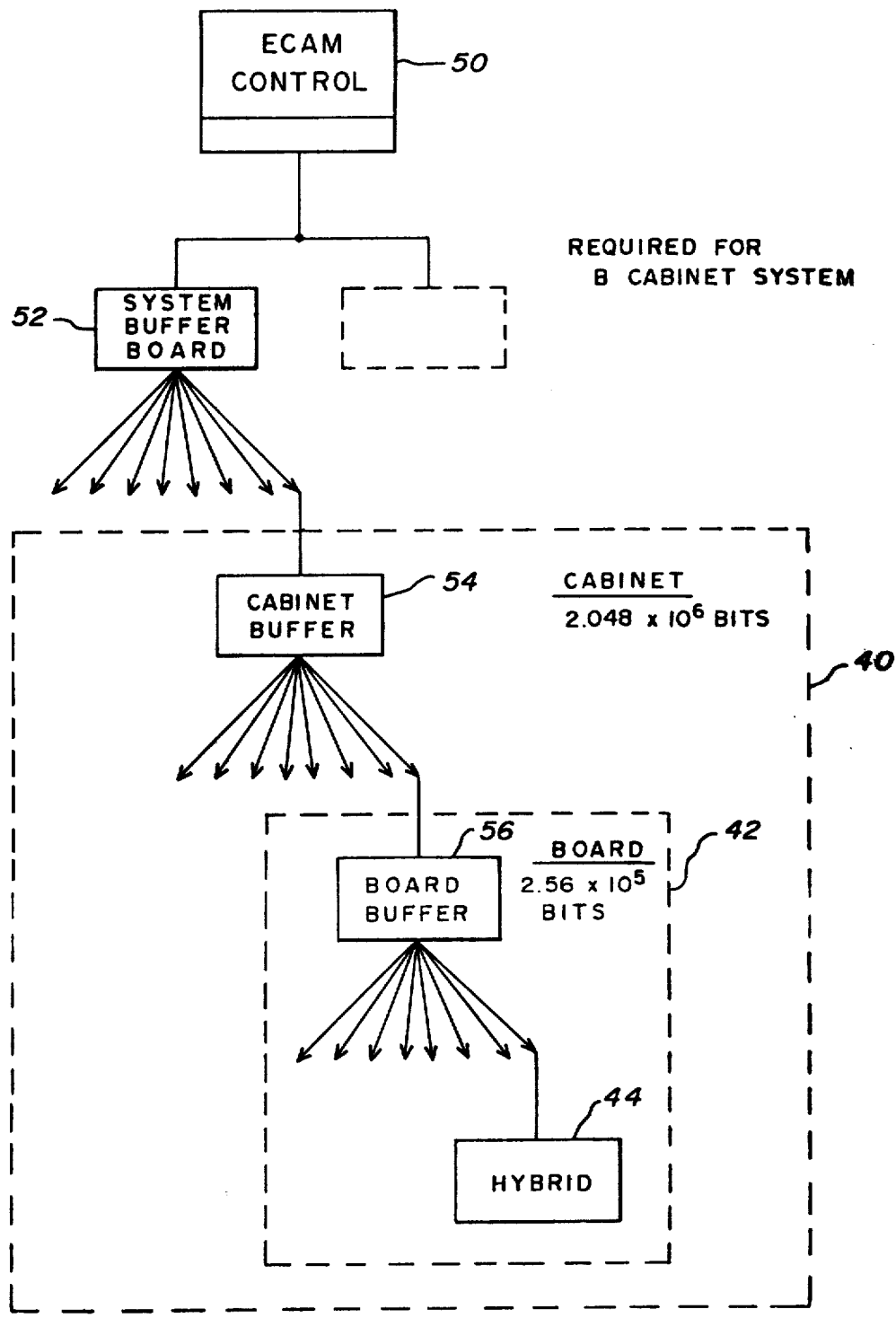
FIG. 4 illustrates ECAM signal distribution.

Control signal distribution throughout the ECAM array is in the form of a fan-out tree as shown in FIG. 4. This technique takes advantage of the physical parallel structure of the array. Commands (called function codes) are issued by the slave controller 14 of ECAM control 50 to all words of the ECAM array. Distribution of the function code signals is performed by a hierarchy of signal buffers. As shown in FIG. 4, system buffer board 52 selects the particular cabinet 40. Cabinet buffer 54 within cabinet 40 selects the particular circuit board 42. In turn, board buffer 56 within circuit board 42 selects the particular hybrid circuit module 44. Tree structured logic for input/output control and multiple match resolution is packaged with the signal distribution buffer.

Figure 5:
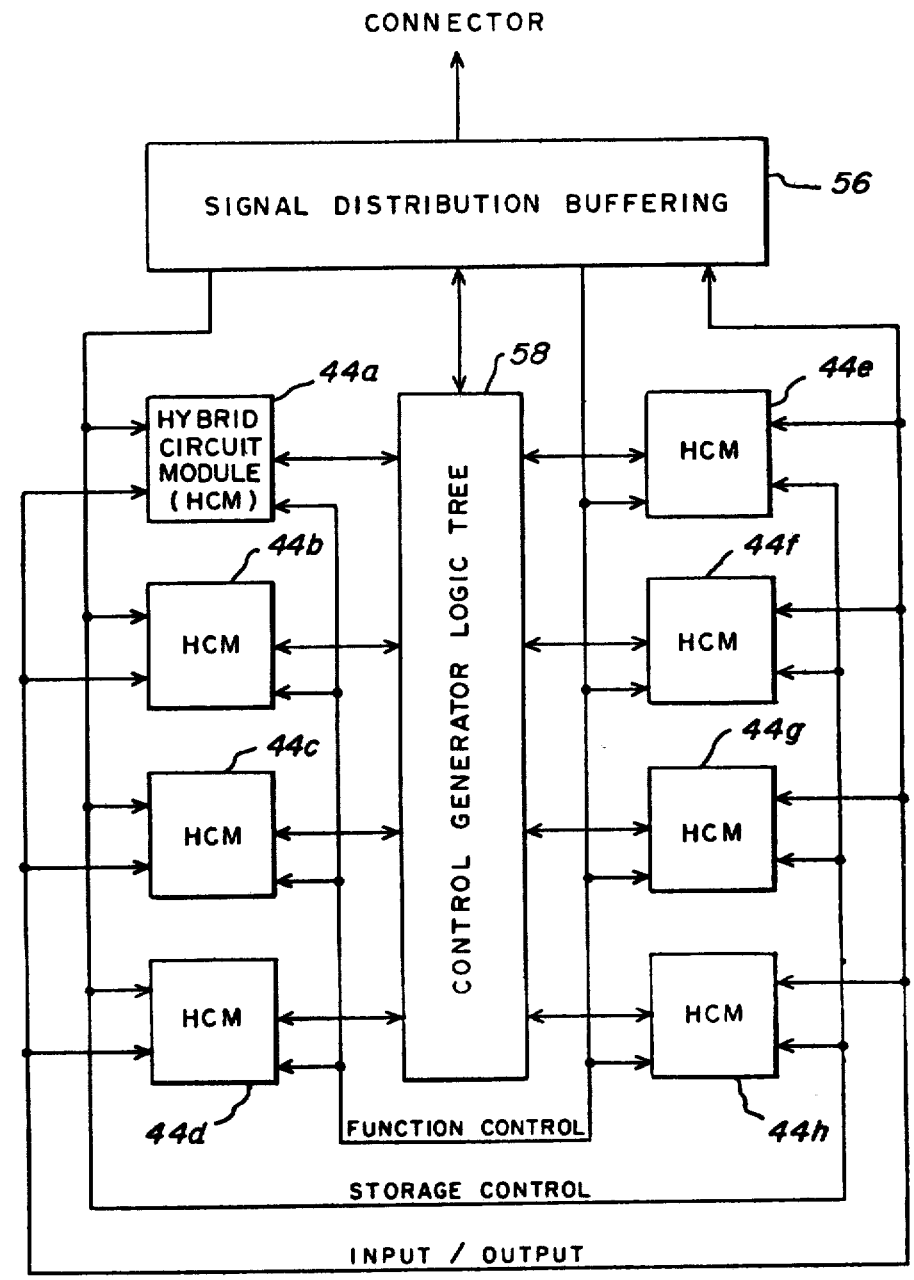
FIG. 5 is a block diagram of an ECAM array circuit board.

The circuit board 42, which is the smallest plug-in replaceable unit, has a storage capacity of over 2.56 million bits. A schematic diagram of one circuit board is shown in FIG. 5. Each board contains eight hybrid circuit modules 44a-44h (all identical); signal distribution buffering circuitry 56; and control generator logic 58.

The control generator logic 58 is a tree structured control circuit implemented with commercially available integrated circuits. It provides the control mechanism for the following functions: (1) input/output; (2) multiple match resolutions; (3) match counting; and (4) physical address determination of the first responding hybrid circuit module.

In order to achieve desirable input/output rates, the array is provided with ten parallel I/O paths. The control generator logic 58 allows selection of the array words which are to be connected to the I/O paths and controls the I/O switches (discussed later) which make the actual connection. The circuit board shown in FIG. 5 contains approximately 49 standard integrated circuits and has 43 connector pins utilized.

Figure 6:
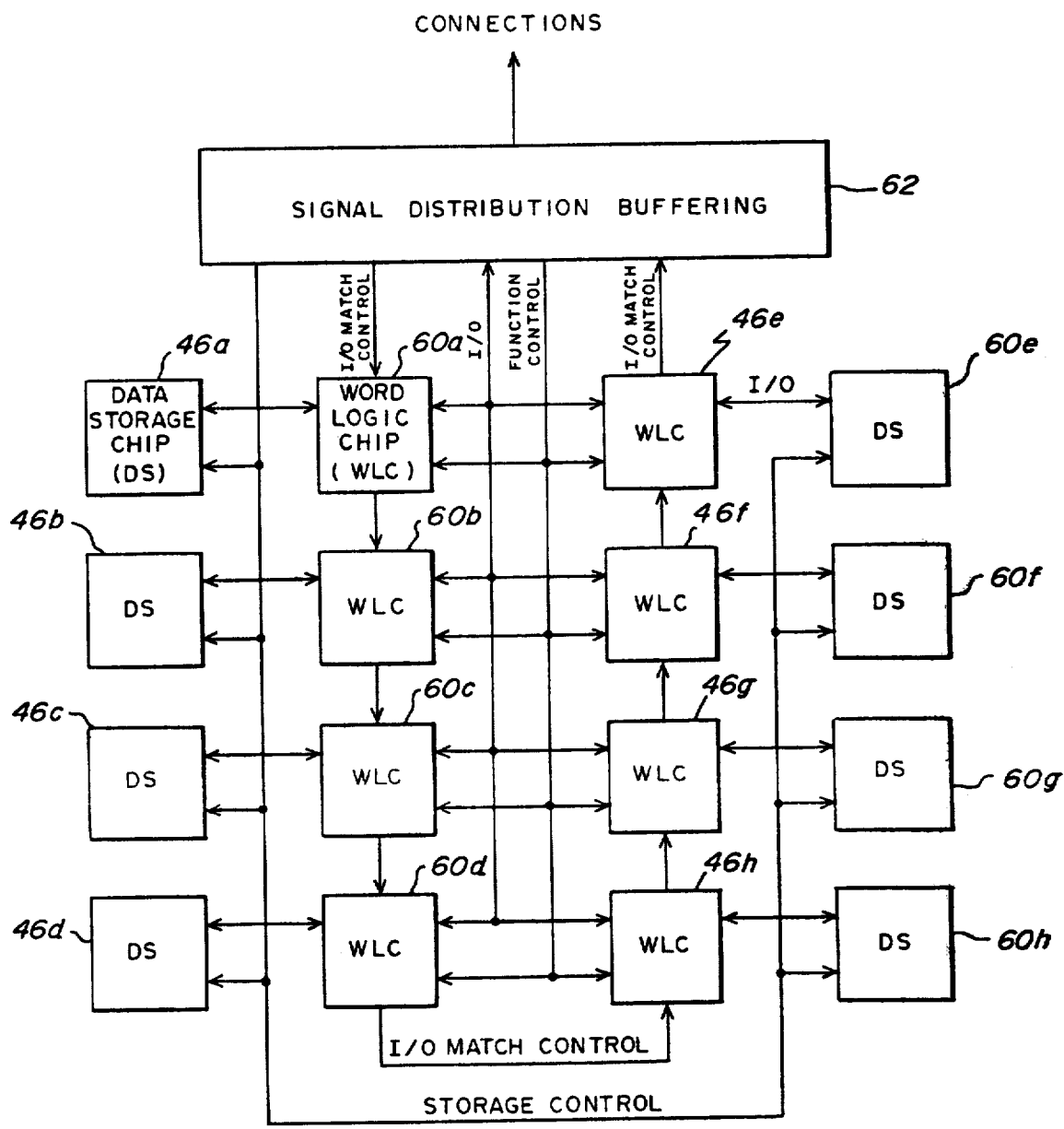
FIG. 6 is a block diagram of an ECAM hybrid circuit module.

As shown in FIG. 6, each hybrid circuit module 44 has a storage capacity of 320K bits and contains eight data storage chips 46a-46h, eight word logic chips 60a-60h associated with the data storage chips, and signal distribution buffering circuitry 62. To simplify the structure and construction of the hybrid circuit module 44, the control generator logic at this level is designed into the word logic chips 60a-60h. Each data storage chip 46a-46h has a total capacity of about 40K bits. The organization is ten words by 4,096 bits.

Figure 7:
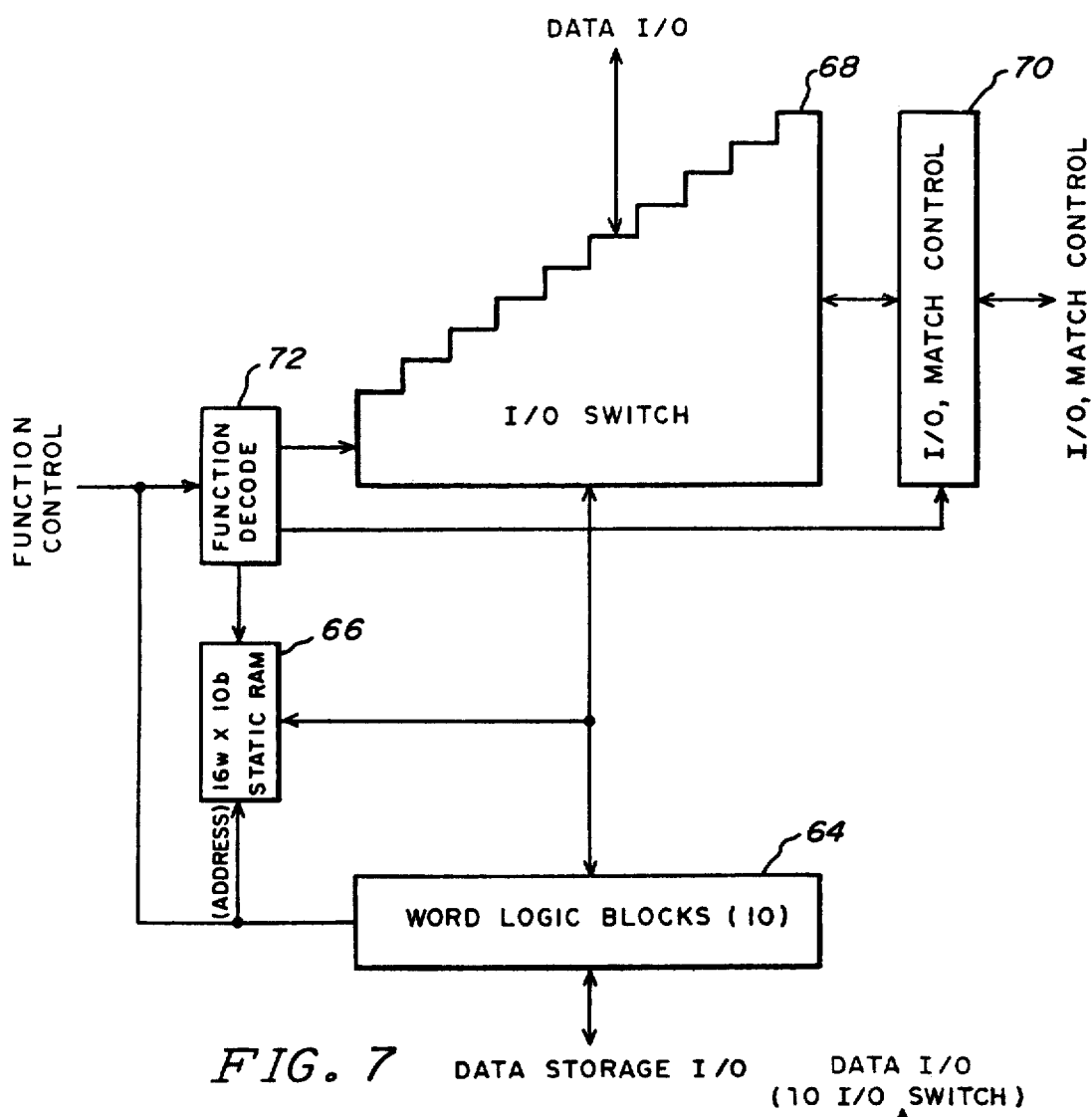
FIG. 7 is a block diagram of an ECAM word logic chip.

The organization of a typical ECAM word logic chip 60 is shown in FIG. 7. The word logic chip includes ten word logic blocks 64, (which are processing elements); a match memory 66 which is a 16 word by 10 bit static random access memory; a 10 word, bit serial I/O switch 68; I/O and multiple match resolver control logic 70; and function code decoding logic 72.

The word logic blocks 64 comprise the data processing portion of the ECAM array. Each word logic block is directly connected to one storage word (4,096 bits). A word logic block can perform such functions as add; subtract; compare with values; input/output; maximum search; minimum search; and between limits search.

Figure 8:
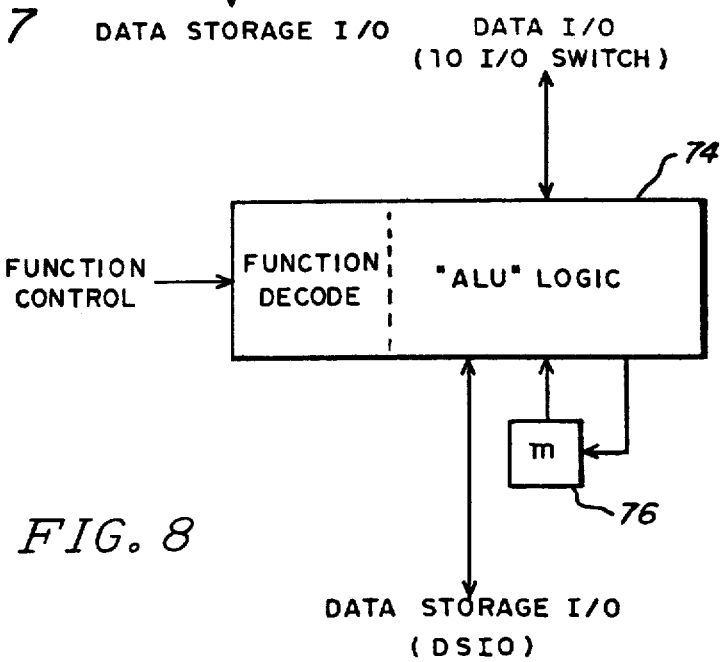
FIG. 8 shows an ECAM word logic block

A typical ECAM word logic block is shown in FIG. 8. Each word logic block includes combinational logic 74 having "Function Decode" and "ALU" logic portions and a match bit (m) store 76. In general, the match bit store 76 serves two purposes. Prior to an operation, the match bits of the various word logic blocks indicate those word logic blocks (and their respective storage words) which will participate in a function. After an operation, the match bits indicate those word logic blocks (and storage words) which "passed" the function. For example, prior to the employee data base search function, one of the match bits indicates the records (words) which will be searched; and after the search, a match bit indicates which of the words satisfies the search criteria.

In addition to its match bit, each array word logic block has an associated match bit memory of 16 bits. This feature facilitates evaluation of complex search expressions by allowing intermediate search results to be stored and later retrieved for combination with the results of additional tests. Word logic functions are provided for manipulation and storage of match bit results.

Figure 9:
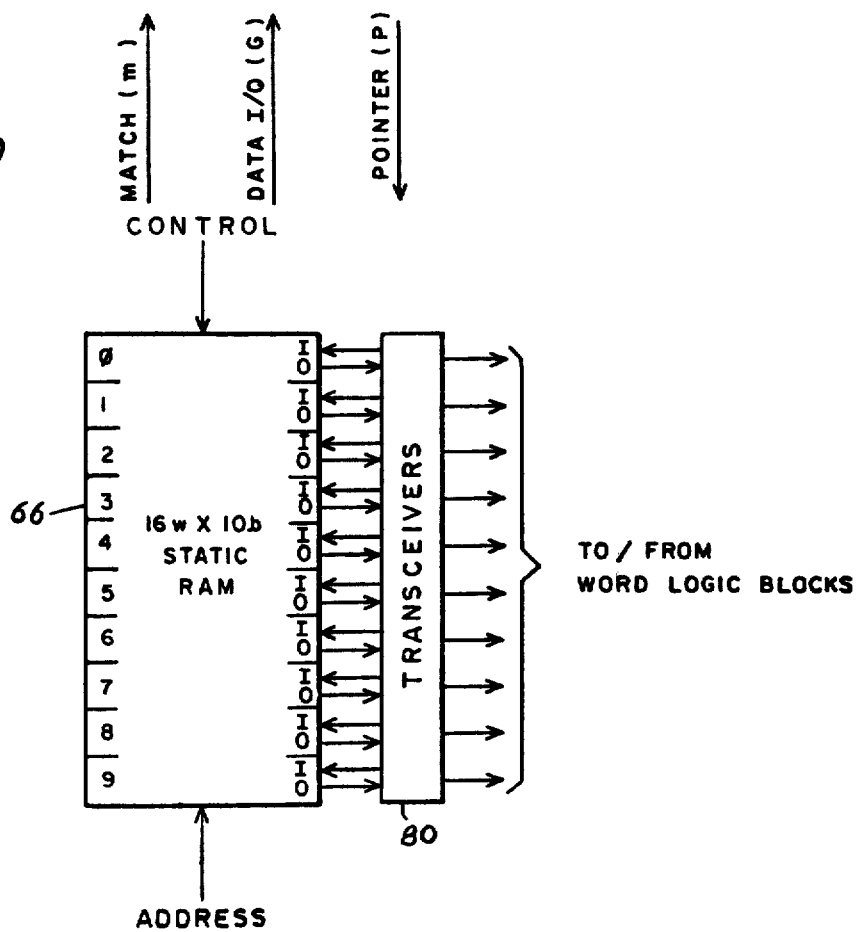
FIG. 9 shows an ECAM match memory.

To ease implementation of the word logic chip, the match bit storage vectors of the ten word logic blocks are combined into a single 16 word by 10 bit random access memory called the match memory 66. In FIG. 9, match memory 66 includes a 16 word by 10 bit static RAM 78 and transceivers 80. A number of interconnections required on the chip are reduced by the use of transceivers 80. Functionally, the match memory 66 operates as if each word logic block had its own dedicated 16 bit match bit storage vector.

Figure 10:
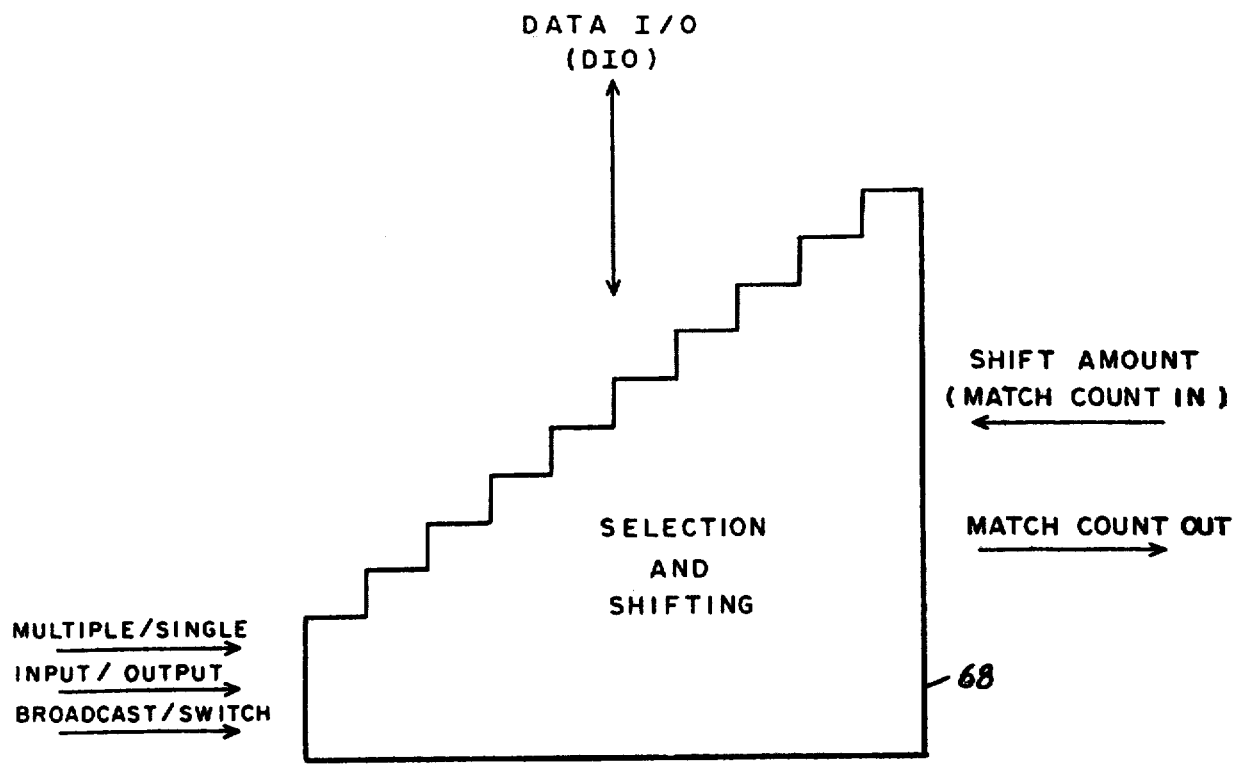
FIG. 10 shows an ECAM I/O switch.

The I/O switch 68, as shown in FIG. 10, allows the simultaneous bit serial input or output of up to ten data storage words. Each word logic chip contains one ten-path I/O switch which is connected to the ten word logic blocks within the chip. The data I/O lines from all I/O switches are combined (ten parallel) by a hierarchy of logic similar to the signal distribution buffering. The I/O switch 68 is also an integral part of the multiple match resolver logic within the ECAM array. In single mode, the I/O switch selects the first responding (m=1) word logic block within the entire array. In multiple mode, the I/O switch 68 selects the first ten (or less) responding word logic blocks. In either case, the respective storage word (words) may then be input or output.

To perform the multiple match resolution (MMR) function, each I/O switch requires control signals which describe the number of detected responding words. This control information is in the form of a list of partial sums. Each partial sum indicates (modulo 16 with overflow) the count of responders beginning at one end of the array. Rather than allow the sum to ripple through the array (a time prohibitive procedure), a summing tree is provided which computes partial sums via a hierarchy of adders. As mentioned earlier, this logic, called the control generator logic tree, provides the control mechanism for (1) input/output; (2) multiple match resolution; (3) match counting; and (4) physical address determination of the first responding hybrid.

Figure 11:
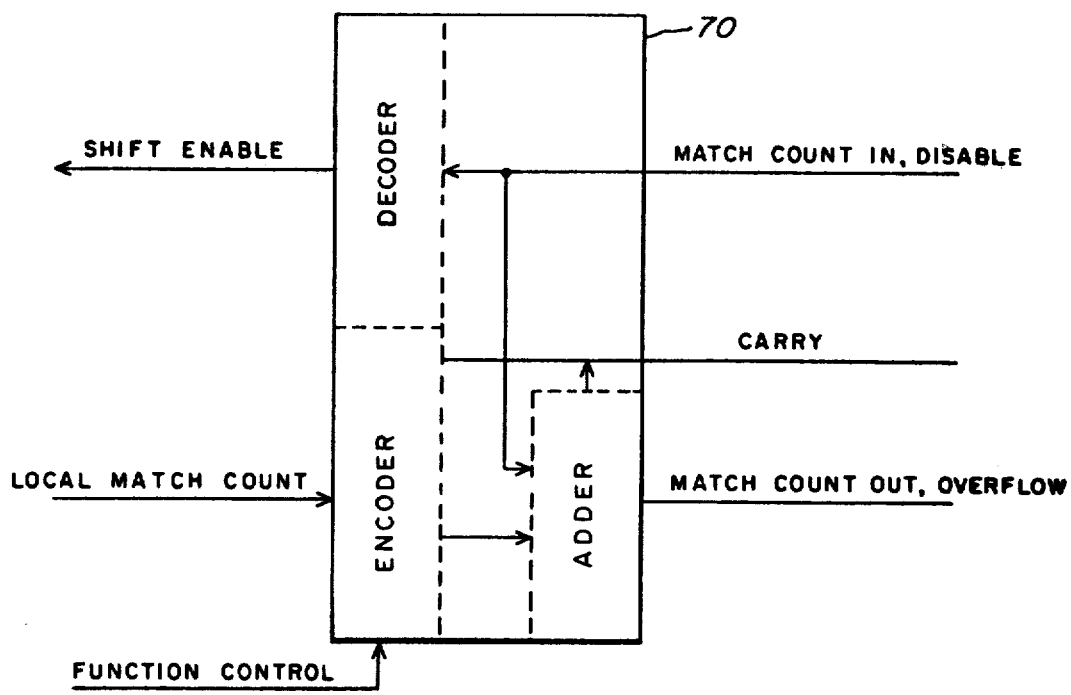
FIG. 11 shows the I/O and multiple match resolver control logic.

The I/O and multiple match resolver control logic 70 is shown in FIG. 11. The logic includes decoder, encoder, and adder sections which generate and combine the match resolver signals in conjunction with the I/O switch and the control generator logic tree.

The functions of the word logic chip are directed by a six bit Function Code (FC). The Function Code is decoded for the I/O switch 68 and the I/O, match control 70 by function decode logic 72. In addition, each word logic block, as shown in FIG. 8, includes logic to decode the Function Code lines.

Figure 12:
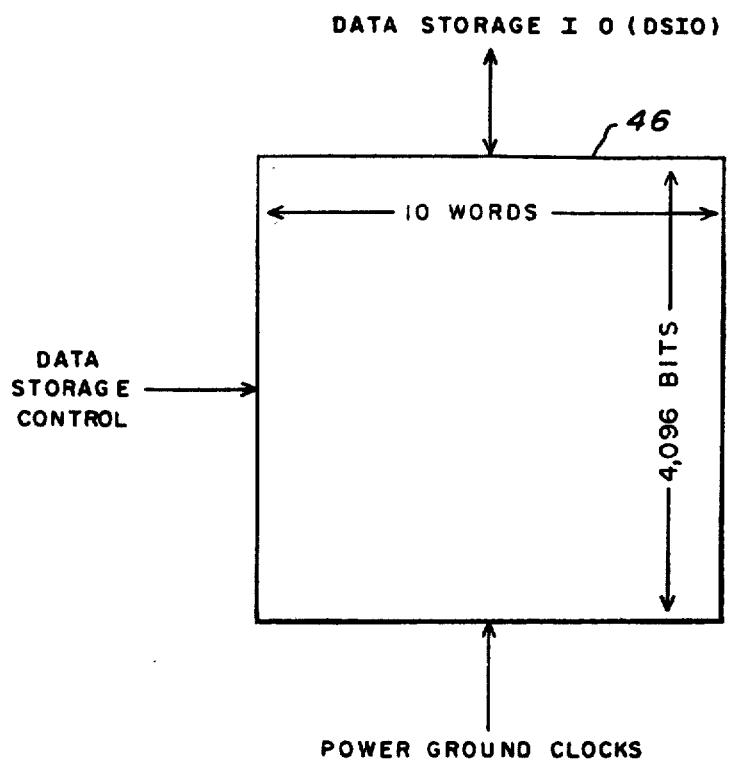
FIG. 12 shows an ECAM data storage chip.

The data storage chip 46, as shown in FIG. 12, contains about 40K bits organized as ten words by 4,096 bits. It is capable of the following operations: (1) read; (2) write; and (3) read-modify-write.

III. Detailed Word Level Description

The word level is the bottom level of the ECAM array structure. It contains the word logic blocks which process the field of the data storage words. It also encompasses the other components of the word logic chip (match memory 66, I/O switch 68, I/O and MMR control logic 70, function code decoding logic 72), and is the processing essence of the ECAM array.

III. A. Word Logic Block

The hardware of the word logic block and the processing functions which it performs will now be discussed. For completeness, a few functions which are not performed directly by the word logic block are also included.

Figure 13:
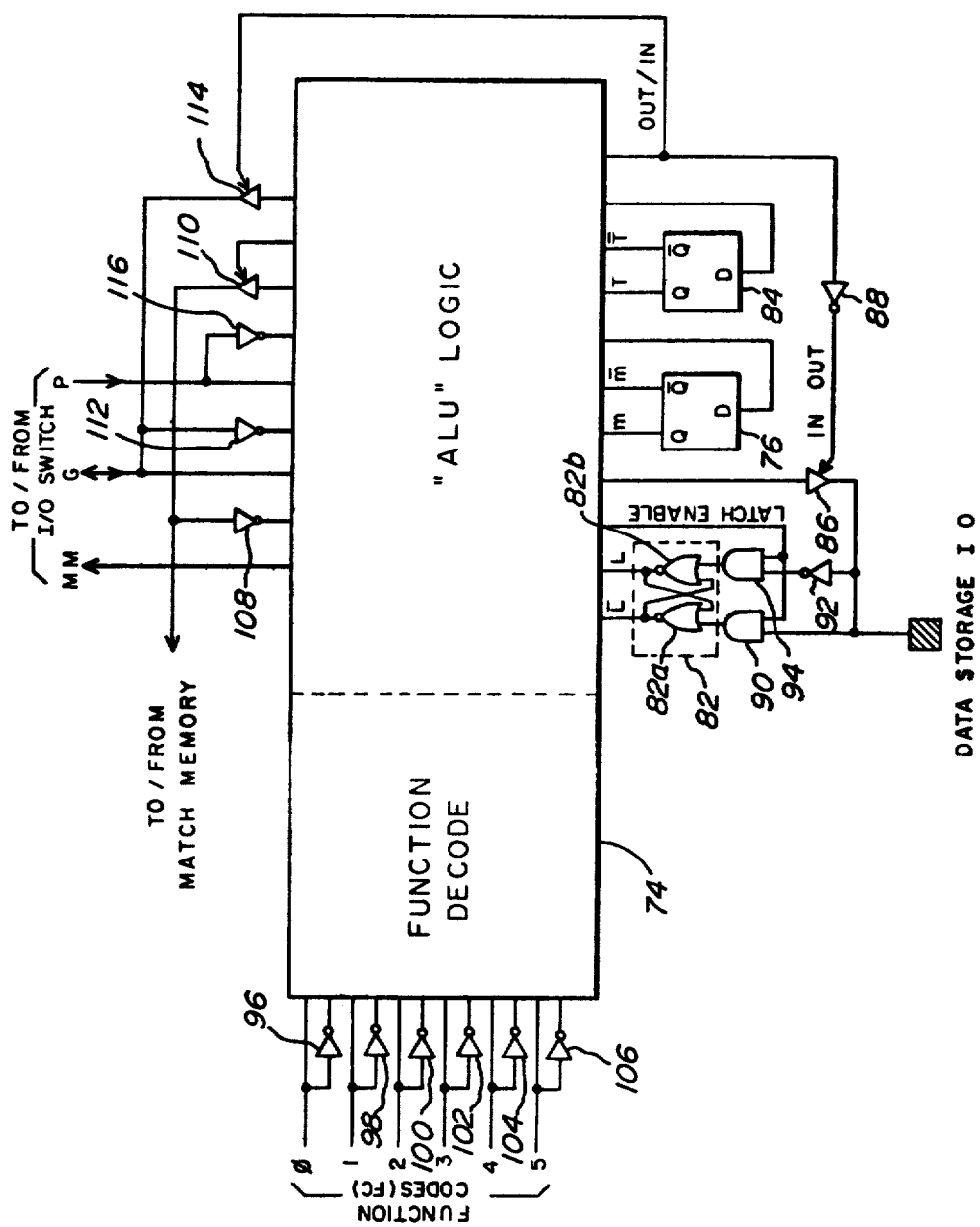
FIG. 13 is a detailed block diagram of the ECAM word logic block.

FIG. 13 shows a detailed schematic of the word logic block, which is the data processing element of the ECAM array. FIG. 13 is, in effect, a more detailed drawing of the word logic block shown in FIG. 8. Similar numbers are used to designate similar elements.

As shown in FIG. 13, the word logic block includes three flip-flops which determine the state of the word logic block. These flip-flops are the match bit (m) flip-flop 76, the storage latch (L) flip-flop 82 formed by NOR-gates 82a and 82b, and temporary (T) flip-flop 84.

Storage latch 82 captures and holds the most recent (current) data bit read out of the data storage chip. The operation of latch 82 is controlled by the latch enable signal from the combinational logic 74 and the state of three state gate 86. The state of three state gate 86 is controlled by the OUT/IN signal from combinational logic 74, which is inverted by inverter 88. The output of three state gate 86 is connected to the Data Storage I/O line and is applied to one input of AND-gate 90 and, through inverter 92, to one input of AND-gate 94. The other inputs to AND-gates 90 and 94 are derived from the latch enable signal. The outputs of AND-gates 90 and 94 control the state of the latch 82.

The match bit flip-flop 76 indicates that the word logic block is an active participant in the current operation (e.g., search, count, input/output). The temporary bit flip-flop 84 serves several purposes including data storage, status indication, and control.

The processing of both data and state is performed by combinational logic 74. The operation of combinational logic 74 may be conceptionally broken into two steps: (1) decode, and (2) processing. The part of combinational logic designated "Function Decode" decodes the six function control lines from slave controller 14. Inverters 96, 98, 100, 102, 104 and 106 invert the signals on the function control lines so that a total of 12 signals are applied to the function decode portion of combinational logic 74. The decoded function opcodes direct data and state processing which takes place in the "ALU logic" portion of combinational logic 74. The implementation of combinational logic 74 is preferably in the form of a programmable logic array or a read-only memory.

Combinational logic 74 also provides outputs to (and accepts inputs from) the match memory (MM) 66 and the I/O switch 68. The match bit may be stored in (or loaded from) the match memory 66. The match memory line MM is directly connected to combinational logic 74 and is also connected through inverter 108 to combinational logic 74. The state of the MM line is controlled by three state gate 110, which is controlled by a Write/Read line from combinational logic 74. The MM line is also connected to the I/O switch so as to provide information necessary for multiple match resolution and high speed input/output.

The global data line (G) transfers data to and from the I/O switch 68. It is connected directly to combination logic 74 as well as being inverted by inverter 112. Three state gate 114, which is controlled by the Out/In line from combinational logic 74, controls the state of the global data line G.

The pointer line (P) is an output from the multiple match resolver circuitry in the I/O switch which indicates the selected (resolved) word or words. Information on the pointer line P is applied directly to combinational logic 74 and is also inverted by the inverter 116.

The ECAM word logic has a capability of performing three types of processing functions: (1) match manipulation; (2) data processing; and (3) input/output. In general, these functions are supplied by the decoding of function code (FC) and the combination of the decodes with array state or data.

In the function descriptions which follow, state or data variables which do not have a new value explicitly stated remain unchanged. Also, some functions may require set-up processing (usually state manipulation) prior to the iteration of the function across bits of the selected data field.

III.A.1. Match Manipulation Functions

FIG. 14 shows the Match Manipulation functions provided by the word logic block, which provide the capability of saving, restoring, manipulating, and initializing word logic state contained in the match bit (m) and the temporary bit (T). The Match Memory functions move match state to or from the match memory. The Boolean functions perform logic operations on m and T. The Initialize functions load m and T from the global data line (G). The Input/Output and Multiple Match Resolver functions determine the operational state of the I/O switch and Multiple Match Resolver as well as effecting match resolution.

III.A.1.a. Match Memory Functions

Figures 15, 16, 17:
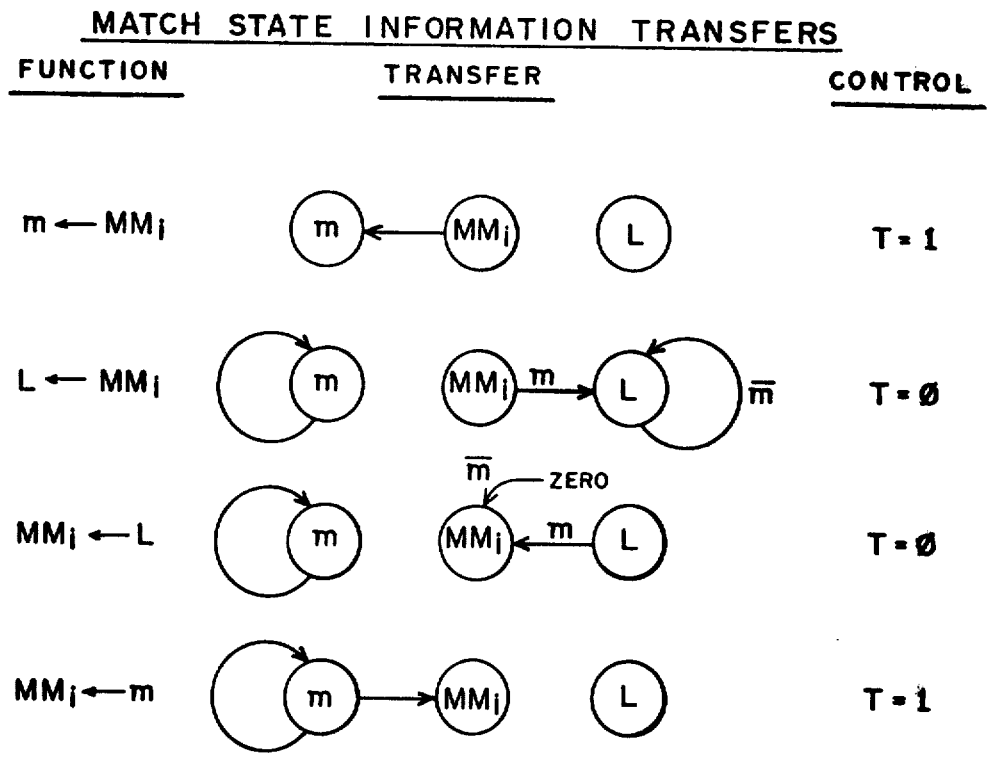
FIG. 15 shows match state information transfers performed by the word logic block.
FIG. 16 shows the data processing functions performed by the word logic block.
FIG. 17 shows the input/output (I/O) functions performed by the word logic block.

The Match Memory functions move match state information to or from the match memory. Transfers to or from the match bit (m) and to or from the data storage (L) are possible. The temporary bit (T) is used as a control variable. Addressing of the match memory is performed by the four least significant function control lines ($FC_{3,2,1,\phi}$). The possible match state information transfers are shown in FIG. 15.

(1) MATCH MEMORY TO MATCH BIT

Prior to ordering this transfer, the temporary bit (T) must be initialized to one (T←1).

The Match Memory to Match Bit function transfers the value of the addressed match memory bit ($MM_i$) of each array word to the match bit (m) of each array word. All words participate in the transfer:

$$m \leftarrow MM_i$$

The transfer equation is:

$$m \leftarrow (T \cdot MM_i) + (\overline{T} \cdot m)$$

(This equation is also used to implement the Match Memory to Storage function (2) when the temporary bit equals zero.)

(2) MATCH MEMORY TO STORAGE

Prior to ordering this transfer, the temporary bit (T) must be initialized to zero (T←0).

The Match Memory to Storage function transfers the value of the addressed match memory bit ($MM_i$) of the participating array words (m=1) to the current bit position of the selected data storage field (L). The storage field of non-participant words remains unchanged. The transfer is:

$$L \leftarrow MM_i$$

The function may be repeated to move all or part of the match memory contents. The iteration equations are:

$$L \leftarrow (m \cdot MM_i) + (\overline{m} \cdot L)$$

$$m \leftarrow (T \cdot MM_i) + (\overline{T} \cdot m)$$

(These equations are also used to implement the Match Memory to Match Bit function (1) when the temporary bit equals one.)

(3) STORAGE TO MATCH MEMORY

Prior to ordering this transfer, the temporary bit (T) must be initialized to zero (T←0).

The Storage to Match Memory function transfers the value of the current bit position of the selected data storage field (L) of the participating array words (m=1) to the addressed match memory bit ($MM_i$). The match memory bit of non-participant words is cleared (set to zero). The transfer is:

$$MM_i \leftarrow L$$

The function may be repeated to load all or part of the match memory. The iteration equation is:

$$MM_i \leftarrow m \cdot (L + T)$$

(The equation is also used to implement the Match Bit to Match Memory function (4) when the temporary bit equals one.)

(4) Match Bit to Match Memory

Prior to ordering this transfer, the temporary bit (T) must be initialized to one (T←1).

The Match Bit to Match Memory function transfers the value of the match bit (m) of each array word to the addressed match memory bit ($MM_i$) of each array word. All words participate in the transfer:

$MM_i \leftarrow m$

The transfer equation is:

$MM_i \leftarrow m \cdot (L+T)$ (The equation is also used to implement the Storage to Match Memory function (3) when the temporary bit equals zero.)

III.A.1.b. Boolean Functions

The Boolean functions perform logical operations on the match bit (m) and the temporary bit (T). All array words participate and no initialization is required.

(1) AND

The AND function replaces the match bit (m) with the logical product of m and the temporary bit (T).

$m \leftarrow m \cdot T$

(2) OR

The OR function replaces the match bit (m) with the logical sum of m and the temporary bit (T).

$m \leftarrow m + T$

(3) EXCLUSIVE OR

The EXCLUSIVE OR function replaces the match bit (m) with the exclusive OR of m and the temporary bit (T).

$m \leftarrow m \oplus T$

(4) COMPLEMENT m

The COMPLEMENT m function replaces the match bit (m) with its logical compliment.

$m \leftarrow \bar{m}$

(5) EXCHANGE

The EXCHANGE function replaces the match bit (m) with the value of the temporary bit (T) and simultaneously replaces T with the value of m

(6) COPY

The COPY function replaces the temporary bit (T) with the value of the match bit (m).

$T \leftarrow m$

(7) COMPLEMENT T

The COMPLEMENT T function replaces the temporary bit (T) with its logical complement.

$T \leftarrow \bar{T}$

III.A.1.c. Initialize Functions

The Initialize functions transfer the value supplied by the slave controller via the global data line (G) to either the match bit (m) or the temporary bit (T). All array words participate.

(1) INITIALIZE m

The INITIALIZE m function replaces the match bit (m) with the value supplied by the slave controller via the global data line (G).

$m \leftarrow G$

(2) INITIALIZE T

The INITIALIZE T function replaces the temporary bit (T) with the value supplied by the slave controller via the global data line (G).

$T \leftarrow G$

III.A.1.d. I/O and MMR Control Functions

The Input/Output (I/O) and Multiple Match Resolver (MMR) control functions determine the operational state of the control generator logic tree, and consequently, the state of the I/O switch and multiple match resolver. Proper operational state is required for Input/Output, Multiple Match Resolution, Responder Counting, and Responding Hybrid Address Determination.

(1) ZERO HYBRID INTERFACE REGISTER

The ZERO HYBRID INTERFACE REGISTER function clears all hybrid interface registers as the first step in establishing the proper operational state of the control generator logic tree.

$HIF \leftarrow \phi$

Note that the implementation of this function is at the board level, not within the hybrid circuit modules.

(2) LOAD HYBRID INTERFACE REGISTER

The LOAD HYBRID INTERFACE REGISTER function causes all hybrid interface registers to capture and retain their respective code values as computed by the control generator logic tree. The captured values are applied to the hybrid circuit modules as the Match Count In. This function is the second step in I/O switch control preparation and multiple match resolution.

$HIF \leftarrow COUNT$

Note that the implementation of this function is not within the hybrid circuit modules.

(3) CAPTURE CARRY

The CAPTURE CARRY function causes all word logic chips to capture and retain their respective carry values as computed by the control generator logic tree and by the I/O, MMR control logic on each chip. This function is one of several which constitute an iteration process for counting responders.

(4) REPORT CARRY

The REPORT CARRY function causes all word logic chips to present their carry value (one or zero) to the match count adders. This function is one of several which constitute an iteration process for counting responders. Under normal (non-counting) conditions, a match count value generated by the I/O switch is presented to the adders. The word logic chips are restored to their normal state by the report matches function.

(5) REPORT MATCHES

The REPORT MATCHES function causes all word logic chips to present their I/O switch generated Match Count value to the match count adders. This is the operational state required for I/O switch control preparation, multiple match resolution, and responding hybrid address determination.

III.A.1.e. Multiple Match Resolver Functions

The Multiple Match Resolver functions modify the vector of match bits (m) across the array in accordance with the result of the multiple match resolver logic. The resolver produces a pointer vector (P) which may indicate either the first true match bit (m=1) or the first ten or less true match bits. The ordering implied by the word "first" is determined by the wiring of the resolver. This ordering is arbitrary, but deterministic. The Control Generator Logic tree must be in the proper operational state before the Multiple Match Resolver functions will produce valid results.

(1) SELECT FIRST

The SELECT FIRST function resets all match bits (m) except the first one (1) as indicated by the pointer vector (P).

$$m \leftarrow P \text{ (slow)}$$

(2) SELECT FIRST SET

The SELECT FIRST SET function resets all match bits (m) except the first ten (10) as indicated by the pointer vector (P). If less than ten match bits are true prior to the execution of the function, then no bits will be reset.

$$m \leftarrow P \text{ (fast)}$$

(3) DISCARD FIRST

The DISCARD FIRST function resets the first one (1) true match bit (m) as indicated by the pointer vector (P).

$$m \leftarrow M \cdot \overline{P} \text{ (slow)}$$

(4) DISCARD FIRST SET

The DISCARD FIRST SET function resets the first ten (10) true match bits (m) as indicated by the pointer vector (P). If less than ten match bits are true prior to the execution of the function, then all bits will be reset.

$$m \leftarrow m \cdot \overline{P} \text{ (fast)}$$

III.A.2. Data Processing Functions

The data processing functions shown in FIG. 16 are arithmetic and relational operations which are performed over fields contained within participating words of the ECAM array. The result of these functions is either a transformed data field or a match result. If the word logic match bits (m) are viewed as a vector indicating the word participants of a data processing function, then a match result may be viewed as a transformation of the match vector such that the resultant match vector indicates those words which were both participants and also satisfied the condition evaluated by the function.

III.A.2.a. Add/Subtract

The Add/Subtract function is a multiple use function which adds the global value (G) supplied by the slave controller to the value in the selected data field of each participating word (m=1) and replaces the data field with the result of the addition/subtraction. The operation is bit serial beginning with the least significant bit (LSB). The currently addressed data storage bit is held by the data storage latch (L) within the word logic block.

The transformations which are possible with the mathmatic add/subtract functions include:

$$L \leftarrow L + G$$

$$L \leftarrow L - G$$

$$L \leftarrow L + 1$$

$$L \leftarrow L - 1$$

$$L \leftarrow L + \phi$$

$$T \leftarrow G \leq L$$

For each data bit, the iteration proceeds by placing the binary sum of L, G, and T into L. Simultaneously, the binary carry is placed in T. At the composition of the iteration process, T contains the carry-out of the most significant bit.

The iteration equations are:

$$L \leftarrow m (L \oplus G \oplus T) + \overline{m} T$$

$$T \leftarrow m (L \cdot G + L \cdot T + G \cdot T) + \overline{m} T$$

Note that the value of L and T remain unchanged in those words which are non-participants (m=$\phi$), and that the match bit of all word logic blocks remains unchanged.

(1) L←L+G

This use of the Add/Subtract function requires that T be initialized to zero for all participating words (state manipulation). The global value (G) is then supplied by the slave controller, least significant bit first, one bit at a time (one bit for each iteration of the function).

(2) L←L−G

To perform subtraction of the global value, the temporary storage bit (T) of each participating word must be initialized to one (carry in = 1). Then the global value (G) is supplied in one's complement form. Alternatively, T may be initiazlied to zero and G then supplied as two's complement.

(3) L←L+1

Incrementing a data field by one is accomplished by initializing T to one (T←1) and adding zero (G=0).

(4) L←L−1

Decrementing a data field by one is accomplished by initializing T to Zero (T←φ) and adding a global value of all ones (two's complement form of minus one).

(5) The Add/Subtract function will result in no change to the data field if T is initialized to zero (T←φ) and the global value is also zero (G=φ).

(6) T←G≦L

This comparison may be performed least significantly bit first by executing the Add/Subtract function in its L←L−G form and noting the value of T at completion. A value of one (T=1) indicates that the global value was less than or equal to the field value. Both values are assumed to be unsigned integers. (Normally T will be moved to m (by m←m·T) to record the result of the comparison.)

III.A.2.b. Reverse Subtract

The Reverse Subtract function subtracts the value of the selected data field (L) of each participating word (m=1) from the global value (G) supplied by the slave controller, and replaces the data field with the result of the subtraction. The data transformation may thus be described as:

L←G−L

The operation is bit serial beginning with the least significant bit (LSB). The temporary bit (T) must be initialized to one (T←1) prior to the iteration of the Reverse Subtract function.

For each data bit, the iteration proceeds by placing the binary sum of L, G, and T into L. Simultaneously, the binary carry (borrow) is placed in T. At the completion of the iteration process, T contains the borrow generated by the most significant bit.

The iteration equations are:

L←m (L+G+T)+m̄ L

T←m (L·G+L̄·T+G·T)+m̄ T

The values of L and T remain unchanged in those words which are non-participants (m=φ), and the m bit of all word logic blocks remains unchanged.

III.A.2.c. Arithmetic Compare

The Arithmetic Compare function compares the value of the selected data field (L) of each participating word (m=1) with the global value (6) supplied by the slave controller, and codes the result of the comparison into m and T:

| m | T | Condition |
|---|---|---|
| φ | 1 | L<G |
| 1 | 1 | L=G |
| 1 | φ | L>G |
| φ | φ | Non-participant |

Proper operation of this function requires that the temporary bit (T) be made equal to the match bit (m) for all words in the ECAM arry (i.e., T←m) prior to beginning the iterations. The operation is bit serial beginning with the most significant bit (MSB).

For each data bit, the iteration proceeds by comparing L and G and resetting the match bit (m) if L<G, or resetting the temporary bit (T) if L>G. Once either bit is reset in a particular word logic block, neither bit will be changed again (only one reset can occur per word). At the end of the interation process, word logic blocks which have both m and T still true correspond to words where L=G.

The iteration equations are:

m←m (T̄+Ḡ+L)

T←T (m̄+G+L̄)

This function does not change the contents of the data storage. Normally the encoded results should be moved to the match bit (m) or the Match Memory (MM) in order to prevent the value of T from being lost during subsequent processing.

III.A.2.d. MIN/MAX

The MIN/MAX function is a dual use function which selects the participating word (m=1) which contains the minimum (or maximum) value data field (L). The selected word is indicated by a match bit value of one. (The match bits of unselected participants are reset.) The two possible transformations are:

m←m·(minimum L)

or m←m·(maximum L)

Multiple responses will result when more than one word contains the minimum (or maximum) value. The operation is bit serial beginning with the most significant bit (MSB).

The iteration process consists of two steps per bit of the selected data field. The first step is the application of the Output function. In the second step the slave controller broadcasts the value produced by the Output function back to each word for comparison. The Output function in this application results in the "or" of the current bit from all participating words. The iteration equations are:

(1) G←m·(T⊕L)<output oring>

(2) m←m·(T (L̄+Ḡ)+T̄ (L+Ḡ) )

The value of L is the same for both steps of the Iteration.

(1) MINIMUM

This use of the MIN/MAX function requires that T be initialized to one (1) for all participating words (T←m). This causes the Output function to apply L̄ to the output "or." A true value (1) from the output "or" indicates that at least one of the participating words contained a zero (φ) at the current bit position. If a zero is detected, the MIN/MAX function (with T=1) will retain as participants only those participating words which contained a zero. If a zero was not detected, all participants will be retained. At the completion of the iteration process only the word (or words) containing the minimum value in the selected data field (L) will be a participant.

(2) MAXIMUM

This use of the MIN/MAX function requires that T be initialized to zero ($\phi$) for all participating words (T←$\phi$). This causes the Output function to apply L to the output "or." A true value (1) from the output "or" indicates that at least one of the participating words contained a one (1) at the current bit position. If a one is detected, the MIN/MAX function (with T=$\phi$) will retain as participants only those participating words which contained a one. If a one was not detected, all particpants will be retained. At the completion of the iteration process only the word (or words) containing the maximum value in the selected data field (L) will be a participant.

III.A.3. Input/Output Functions

The Input/Output functions shown in FIG. 17 allow the loading or unloading of words (or fields within words) in the ECAM array. The I/O switch permits up to ten array words to be loaded or unloaded simultaneoulsly in a bit serial manner.

III.A.3.a. INPUT

The INPUT function transfers data from the global data lines (G) to the selected data field (L) of each participating word (m=1). The data transfer is:

$$L \leftarrow G$$

The operation is bit serial beginning with either the least significant bit (LSB) or the most significant bit (MSB). No initialization is required and up to ten (10) words may be loaded simultaneously.

For each data bit, the iteration replaces the data storage bit with the binary value of one global line. The mapping of global data lines to array words is performed by the I/O switch. The iteration equation is:

$$L \leftarrow m \cdot G + \overline{m} \cdot L$$

Non-participant words remain unchanged (m=$\phi$).

III.A.3.b. OUTPUT

The OUTPUT function transfers data from the selected data field (L) of each participating word (m=1) to the global data lines (G). The data transfer may be in either true (L) or complement ($\overline{L}$) form. Thus the data transfers which are possible are:

$$G \leftarrow L$$

$$G \leftarrow \overline{L}$$

The operation is bit serial beginning with either the least significant bit (LSB) or the most significant bit (MSB). The temporary bit (T) must be initialized to zero (T←$\phi$) for true data transfer, and to one (T←1) for complement data transfer. If the fast I/O function has been previously selected, up to ten (10) words may be unloaded simultaneously.

For each data bit, the iteration places the value of the data storage bit (true or complement) on the global data line. The mapping of array words to global data lines is performed by the I/O switch. The iteration equation is:

$$G \leftarrow m \cdot (T + L)$$

All words, fields, and match bits remain unchanged.

III.A.3.c. FLAG DUPLICATES

The FLAG DUPLICATES function is an adjunct to the Output function. It detects those participating words (m=1) in which the selected data field (L) is equal to the field of the word being output from the array. The state transformation is:

$$T \leftarrow L = G$$

The operation is bit serial beginning with either the least significant bit (LSB) or the most significant bit (MSB). The temporary bit (T) must be initialized to one (T←1).

For each data bit, the iteration process consists of two steps. First, the Output function is applied. Then, during the Flag Duplicates function, the slave controller broadcasts the output data bit back to the array for comparison. The global data line (G) is compared to the current data bit (L), and the result is placed in the temporary bit (T). The iteration equation is:

$$T \leftarrow T \cdot (\overline{L} + G)$$

The match bit (m) of all word logic blocks remains unchanged.

III.A.4. ECAM Array Functions Summary

Table I presents the ECAM array functions in tabular form. The meanings of the columns are discussed in the following paragraphs.

Control of the array is established by both the word logic Function Code (FC) lines and the storage control lines (shift, RMW). The first thirty-two function codes (00-1F) utilized the four least significant bits (3,2,1,0) to address the match memory. Those same codes also use the temporary flip-flop (T) as an additional control variable. Note that only the read and modify modes of the storage device are used. The write mode is not required. Function codes 3B through 3F are identical to the no operation code (NOP, 35).

The function column describes each array activity in symbolic form. The local match input column lists the logic equations applied to the input of the match bit flip-flop (M). The temporary input column lists similar equations for the temporary flip-flop (T).

The match memory requires both input and control. The input equations are listed under the MM$_i$ input heading. The symbol X indicates a "don't care" input. The equations shown also serve as input to the I/O switch. Therefore, some functions list a value even though the match memory is not affected. The read/write control is meaningful only when the match memory is enabled (ENAB=1).

The global data columns list both the output equation (input is determined by the slave controller) and the I/O switch controls. The F/S/B column designates fast (F), slow (S), or broadcast (B) as the operating mode of the switch. The input and output functions requires that the switch not be in the broadcast mode. For those functions, fast or slow is determined by a previously executed resolve function (such as Select First).

The storage part columns show the storage device input equations and the storage data latch (L) control signal (ENAB). A one (1) indicates that the latch is enabled to capture a data bit from the storage device.

The notes column provides explanatory comments for many of the function codes.

TABLE I

| CONTROL LINES | | | | | ECAM ARRAY ACTIVITIES | | | | | | | | | |
|---|---|---|---|---|---|---|---|---|---|---|---|---|---|---|
| WORD LOGIC CODE (FC) | | STORAGE CONTROL | | | LOCAL MATCH (m) INPUT | MATCH MEMORY | | | TEMPORARY | | GLOBAL DATA | | STORAGE PART INPUT | LATCH ENAB | NOTES |
| 5,4 | 3-0 | SHIFT | AMW | FUNCTION | | MM. PUT | RW | ENAB | (T) INPUT | INPUT | I/O | F/S/B | | | |
| 0 | 0-F | 0 | R | $MM_i \rightarrow m$ | $(MM_i \cdot T) + (m \cdot \bar{T})$ | X | R | 1 | T | X | X | X | $X(MM_i \cdot m) + (L \cdot m)$ | 1 | Normally T=1 |
| 0 | 0-F | 1 | M | $MM_i \rightarrow$ Store where m | $(MM_i \cdot T) + (m \cdot \bar{T})$ | X | R | 1 | T | X | X | X | $(MM_i \cdot m) + (L \cdot m)$ | 1 | Normally T=0 |
| 1 | 0-F | 1 | R | Store $\rightarrow MM_i$ where m | | $m \cdot (L+T)$ | W | 1 | T | X | X | X | | 1 | Normally T=0 |
| 1 | 0-F | 0 | R | $0 \rightarrow MM_i$ where $\bar{m}$ | m | $m \cdot (L+T)$ | W | 1 | T | X | X | X | | 1 | Normally T=1 |
| 2 | 0 | 1 | R | $m \rightarrow MM_i$ | m | m | X | 0 | $T \cdot (m+\bar{G}+\bar{L})$ | X | 1 | B | X | 1 | Produces result coded in m and T |
| 2 | 0 | | R | Arithmetic Comp | $m \cdot (\bar{T}+\bar{G}+L)$ | m | X | 0 | $T \cdot (m+\bar{G}+\bar{L})$ | X | 1 | B | X | 1 | |
| 2 | 1 | 1 | M | ADD/SUBTRACT | m | m | X | 0 | $m \cdot (T \cdot L) + T \cdot G) + (L \cdot G)) + (\bar{m} \cdot T)$ | X | 1 | B | $\bar{m} \cdot (T+L+G) + m \cdot L$ | 1 | T is CARRY/BORROW |
| 2 | 2 | 1 | R | COMPARE FROM LSB | m | m | X | 0 | $m \cdot (\bar{T} \cdot L) + (T \cdot G) + (L \cdot G)) + (\bar{m} \cdot T)$ | X | 1 | B | $m \cdot (T+L+G) + m \cdot L$ | 1 | T indicates $G \leq L$ |
| 2 | 3 | 1 | M | REVERSE SUBTRACT | m | m | X | 0 | $m \cdot (\bar{T} \cdot L) + (T \cdot G) + (L \cdot G)) \pm (m \cdot T)$ | X | 1 | B | $m \cdot (T+L+G) + m \cdot L$ | 1 | T is BORROW |
| 2 | 4 | 0 | R | MIN/MAX | $\underline{m} \cdot ((T \cdot (\bar{L}+\bar{G})) + (T \cdot (L+G))$ | m | X | 0 | T | X | 1 | $\bar{B}$ | X | 1 | Used with OUTPUT (1T) |
| 2 | 5 | 0 | R | T→duplicates | m | m | X | 0 | $T \cdot (\bar{L}+G)$ | X | 1 | B | X | 1 | Used with OUTPUT (2T) |
| 2 | 6 | 1 | M | INPUT | m | m | X | 0 | T | X | 1 | $\underline{B}$ | $(m \cdot G) + (\overline{m \cdot L})$ | 1 | |
| 2 | 7 | 1 | R | OUTPUT | m | m | X | 0 | T | $m \cdot (T+L)$ | 0 | B | X | 1 | |
| 2 | 8 | 0 | R | EXCHANGE T,m | T | X | X | 0 | m | X | X | X | X | 0 | |
| 2 | 9 | 0 | R | T→G | m | m | X | 0 | G | X | 1 | B | X | 0 | |
| 2 | A | 0 | R | T→$\underline{m}$ | $\bar{m}$ | X | X | 0 | $\underline{m}$ | X | X | X | X | 0 | Used to SET/CLEAR T |
| 2 | B | 0 | R | T→T | $\bar{m}$ | X | X | 0 | T | X | X | X | X | 0 | |
| 2 | C | 0 | R | m→G | G | m | X | 0 | T | X | 1 | B | X | 0 | |
| 2 | D | 0 | R | m→m·T | m·T | X | X | 0 | T | X | X | X | X | 0 | Used to SET/CLEAR m |
| 2 | E | 0 | R | m→m+T | m+T | X | X | 0 | T | X | X | X | X | 0 | |
| 2 | F | 0 | R | m→$\underline{m} \oplus T$ | $\underline{m} \oplus T$ | X | X | 0 | T | X | X | X | X | 0 | |
| 3 | 0 | 0 | R | m→m | m | m | X | 0 | T | X | X | X | X | 0 | |
| 3 | 1 | 0 | R | m→P (slow) | P | m | X | 0 | T | X | X | s | X | 0 | Select First |
| 3 | 2 | 0 | R | m→P (fast) | P | m | X | 0 | T | X | X | F | X | 0 | Select First Set |
| 3 | 3 | 0 | R | m→m·$\bar{P}$ (slow) | $m \cdot \bar{P}$ | m | X | 0 | T | X | X | s | X | 0 | Discard First |
| 3 | 4 | 0 | R | m→m·$\bar{P}$ (fast) | m·$\bar{P}$ | m | X | 0 | T | X | X | F | X | 0 | Discard First Set |
| 3 | 5 | 0 | R | NOP | m | X | X | 0 | T | X | X | X | X | 0 | Occurs also as codes |

TABLE I-continued

| WORD LOGIC CODE (FC) | | CONTROL LINES | | | | ECAM ARRAY ACTIVITIES | | | | | | | | |
|---|---|---|---|---|---|---|---|---|---|---|---|---|---|---|
| | | STORAGE CONTROL | | | | LOCAL MATCH (m) INPUT | MATCH MEMORY | | | | TEMPORARY (T) INPUT | GLOBAL DATA | | STORAGE PART INPUT | LATCH ENAB | NOTES |
| 5,4 | 3-0 | SHIFT | AMW | FUNCTION | | | MM; PUT | IN-RW | ENAB | | INPUT | I/O | F/S/B | | | |
| 3 | 6 | 0 | R | HIF←0 | | m | x | x | 0 | T | x | x | x | x | 0 | 3B through 3F I/O, MMR Preparation |
| 3 | 7 | 0 | R | HIF←Count | | m | m | x | 0 | T | x | x | x | x | 0 | I/O, MMR Preparation |
| 3 | 8 | 0 | R | CAPTURE CARRY | | m | m | x | 0 | T | x | x | x | x | 0 | For Responder Counting |
| 3 | 9 | 0 | R | REPORT CARRY | | m | x | x | 0 | T | x | x | x | x | 0 | For Responder Counting |
| 3 | A | 0 | R | REPORT MATCHES | | m | x | x | 0 | T | x | x | x | x | 0 | Restore State after Responder Counting |

III. B. Match Memory

Figure 18:
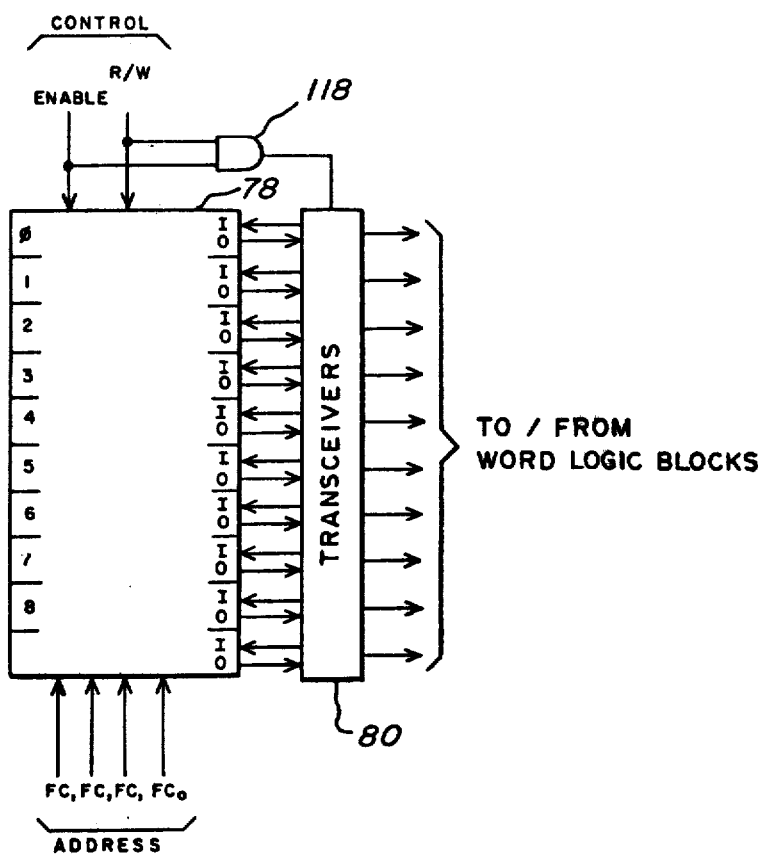
FIG. 18 shows the ECAM match memory.

FIG. 18 shows the ECAM match memory. As shown in FIG. 18, the ECAM match memory is generally similar to that shown in FIG. 9, and similar numerals are used to designate similar elements.

The match memory includes the 16-word by ten bits static random access memory 78. Each of the ten data bits of each word is dedicated to a particular word logic block. To minimize conductor paths on the word logic chip, the inputs and outputs of static random 78 are combined into bidirectional lines by transceiver circuits 80. Word addressing is controlled by a four least significant function code lines ($FC_{3,2,1,\phi}$). The control signal, enable and read/write (R/W), are derived from the function code (FC) by the function code decoding logic 72, as shown in FIG. 7. The control signals are also ANDed by AND-gate 118 to control transceivers 80. Because the random access memory is static, no special clocking or refresh circuitry is required.

As discussed earlier, the consolidation of the match bits storage vector into a random access match memory is a means of achieving packaging efficiency. Functionally, each of the 16-bit columns of the match memory is considered to be "part of" one of the word logic blocks as shown in FIG. 2. Grouping of these 16-bit columns into a single memory does not limit the information process or searching capabilities of the ECAM array.

III. C. Input/Output (I/O) Switch

The input/output (I/O) switch is the data transfer element of the ECAM array. All data being transferred between the control unit and the word logic blocks or data storage devices passes through an I/O switch. There is one switch on each word logic chip.

In parallel and associative systems, high speed input/output is usually a problem. In memories like the ECAM, where access to the bits within a word is serial, the normal expedient of providing word parallel I/O is not too effective, since the transfer rate potential of a word parallel bus cannot be sustained by the serial data available at a single word.

In order to increase ECAM data I/O rates, then a scheme enabling data transfer simultaneously from several words must be provided. One alternative is physical partitioning of the ECAM, but this approach has serious disadvantages.

In a physical partition, several disjoint portions of the system can be provided with I/O connections which transfer data simultaneously. Within a region, selection of words is accomplished by the partitioned multiple match resolver circuit. This approach has two serious disadvantages. First, it is vulnerable to worst case data distributions in which all words to be transferred reside in a single physical region. In such cases, the transfer rate drops to the basic part speed. Second, the software complexity of handling the data, particularly on the input, is considerable.

The I/O switch used in the ECAM avoids these problems. The I/O switch is basically an extension of the inherent logical selection mechanism of the ECAM which is used to select several words simultaneously for input/output.

Figure 19:
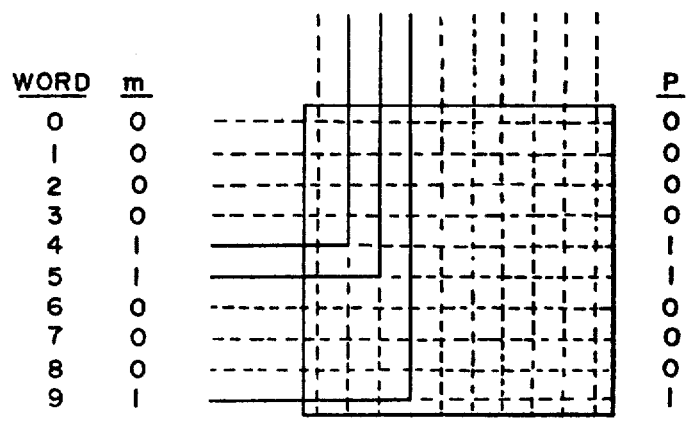
FIG. 19 illustrates the operation concept of the ECAM high speed I/O switch.

The operation of the I/O switch is shown conceptually in FIG. 19. A switch matrix selects the "first" participating words (M=1) and switches them onto the first available I/O lines. In the example shown in FIG. 19, words four, five, and nine are participants. If an I/O switch higher in the ECAM array has already utilized one I/O line (e.g. line 0), then the switch routes data from words 4, 5, and 9 to I/O lines 1, 2, and 3. The I/O switch also produces a match count value (equal to three in this case) which can be added to previous match counts thereby providing a control input to subsequent I/O switches. The match count additions are performed by the I/O and MMR logic and by the control generator's logic tree. The P vector indicates (to the word logic) the first (or first ten) responder(s) of the entire array.

Figure 20:
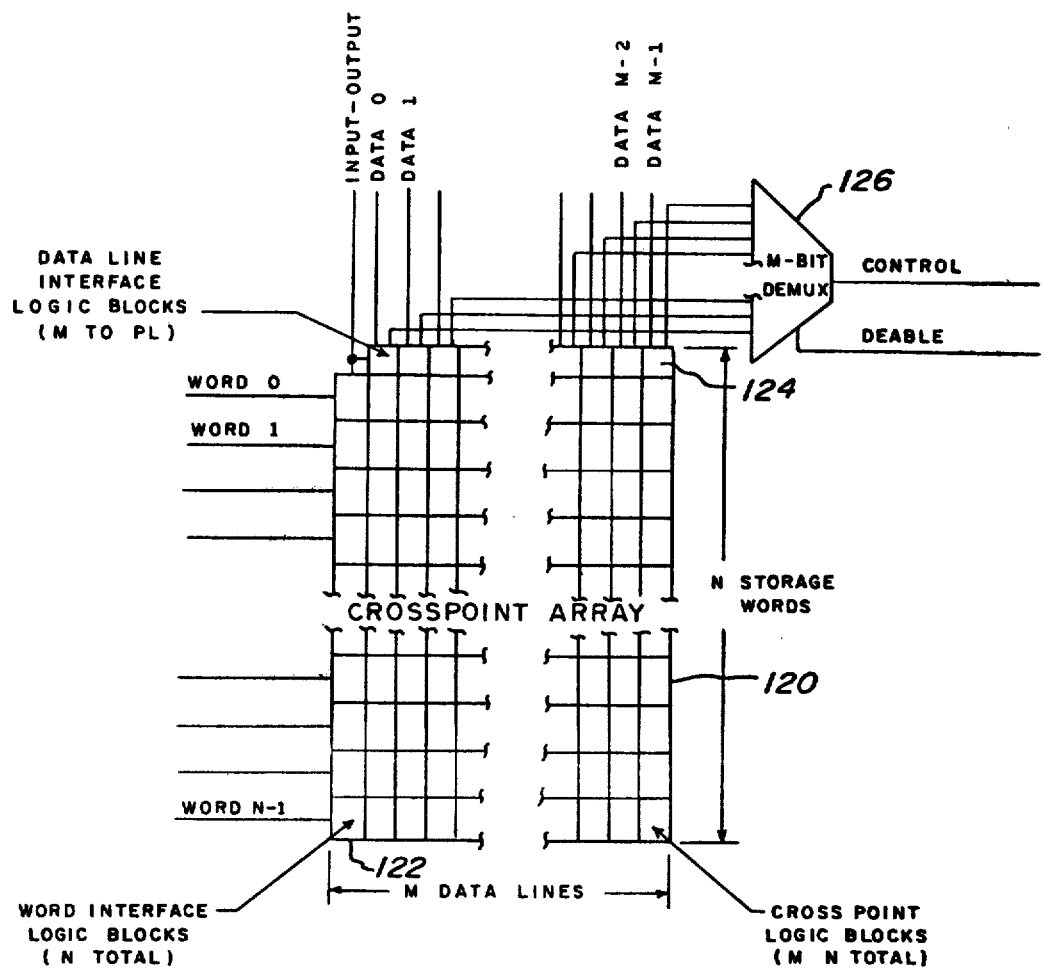
FIG. 20 shows one embodiment of the I/O switch.

FIGS. 20–23 illustrate one specific implementation of an I/O switch using the operating concept illustrated by FIG. 19. In FIG. 20, the I/O switch is a logically controlled switch which connects the serial input/output lines from individual words (i.e., the "word lines") to input/output buses (the "data lines") based on the state of the respective m bits and the availability of the I/O lines. In FIG. 20, N words are potentially connectable to M data lines. Thus, up to M times the word shift rate can be obtained once the paths are established.

The I/O switch shown in FIG. 20 includes a cross-point array of M by N total cross-point logic blocks together with N total word interface logic blocks 122 which interface the word lines to the cross-point array 120 and a total of M data line interface logic blocks 124 which interface the data lines to the cross-point array 120. An M bit demultiplexer 126 decodes the control codes and energizes selected columns of the cross-point array 120.

Figure 21:
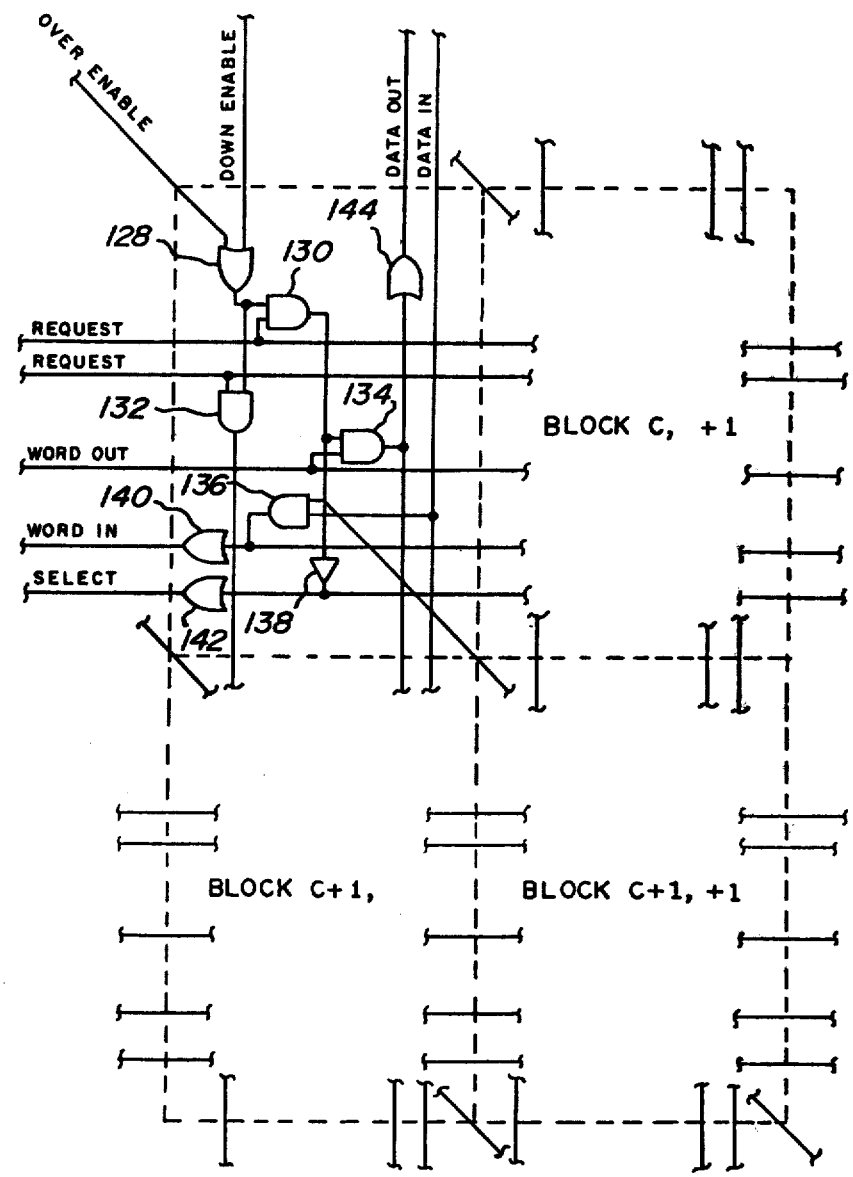
FIGS. 21, 22 and 23 show logic blocks utilized in the I/O switch of FIG. 20.
Figure 22:
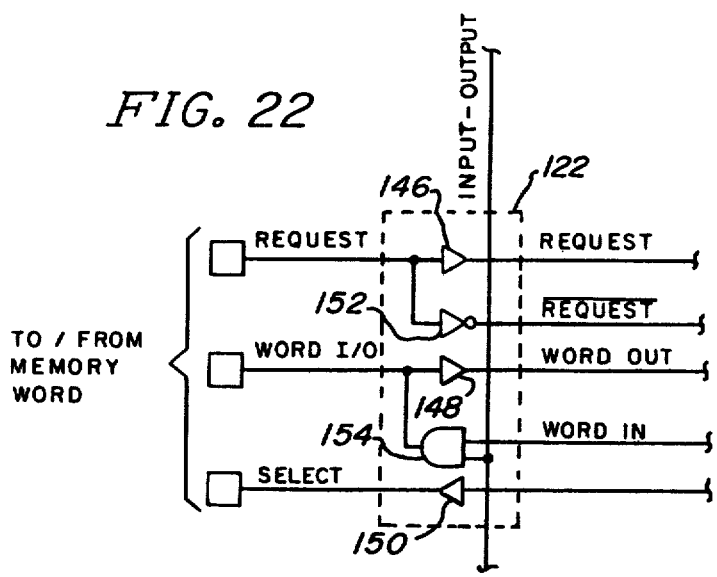
Figure 23:
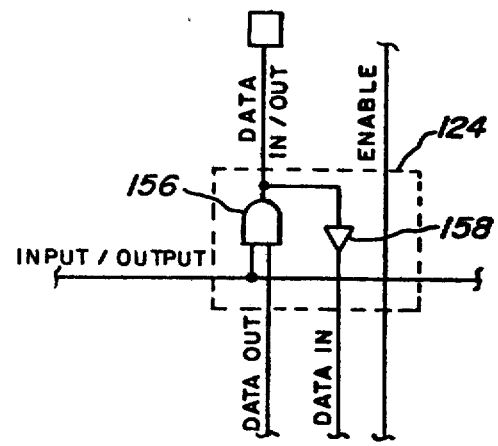

FIG. 21 shows an example of the cross-point logic blocks. FIGS. 22 and 23 show examples of implementation of the word interface logic and the data line interface logic, respectively.

The basic operation of the cross-point array is that an enable signal is generated at the top, indicating the first (left-most) data line available for connection. This signal then propogates down the column of the array until it reaches a cross-point where a word has made an I/O request. At this cross-point, the enable and the request cause the word I/O lines to switch onto the data lines. In addition, the enable signal is propogated diagonally downwards so that the next requesting word will be connected to the next data line to the right. This process continues until the enable signal has reached the bottom of the cross-point array. At that time, all words requesting I/O have been connected to a data line, provided that there are data lines available for connection.

The typical cross-point logic blocks shown in FIG. 21 include OR-gate 128, AND-gates 130, 132, 134, and 136, buffer gate 138, and wire OR-gates 140, 142, and 144. OR-gate 128 receives the enable line. If either the OVER ENABLE signal from the previous diagonal block or a DOWN ENABLE signal from immediately above the cross-point block is received, OR-gate 128 will apply the ENABLE signal to one input of AND-gate 130 and one input of AND-gate 132.

If a REQUEST from a word is present on the REQUEST line, the output of AND-gate 130 will be "1". The output of AND-gate 130 determines whether a connection will be made at that cross-point. In addition, it generates the diagonal OVER ENABLE which moves the enable signal over one column.

If the output of AND-gate 130 is "1", AND-gates 134 and 136 will be in a state which allows connection between the WORD OUT and IN lines to the DATA IN AND OUT lines respectively.

In the event that an ENABLE signal is present, but no REQUEST is made by the particular word, AND-gate 132 causes the ENABLE signal to be propogated down to the next lower cross-point logic block. The ENABLE signal continues to propogate down a column until a REQUEST signal is present. At that point, the appropriate connection is made between the word lines and the data lines and a diagonal OVER ENABLE signal is propogated diagonally downward to the right.

Gates 138, 140, 142 and 144 serve as isolators for the various lines. For example, gate 138 prevents the SELECT signal from another block from being fed back to the inputs of gates 134 or 136. The SELECT signal indicates that a connection has been made for that particular word, and is propogated to the left to the memory word.

The word interface logic shown in FIG. 22 includes isolator gates 146, 148, and 150, inverter 152, and AND-gate 154. Isolator gate 146 and inverter 152 provide the REQUEST and $\overline{\text{REQUEST}}$ signals which propogate to the right in the cross-point array. Isolator 148 and AND-gate 154 interface the single bidirectional word I/O line from the memory word to the separate WORD OUT and WORD IN lines used in the cross-point array. Isolator 150 allows the select signal to propogate only from the cross-point array toward the memory word.

In FIG. 23, an example of data line interface logic is shown. AND-gate 156 and isolator 158 allow data transfer between the separate DATA OUT and DATA IN lines of the cross-point array and the common bidirectional DATA I/O line. The determination of whether data will be transferred in or out to the data line interface logic is determined by the state of the $\overline{\text{INPUT/OUTPUT}}$ shown in FIG. 23.

Although the particular embodiment of the I/O switch shown in FIGS. 20–23 does perform the desired functions, it is desirable to simplify the switch wherever possible. This is particularly important since the I/O switch is preferably formed as a large scale integrated circuit. Any reduction in size of the integrated circuit is particularly advantageous.

Figure 24:
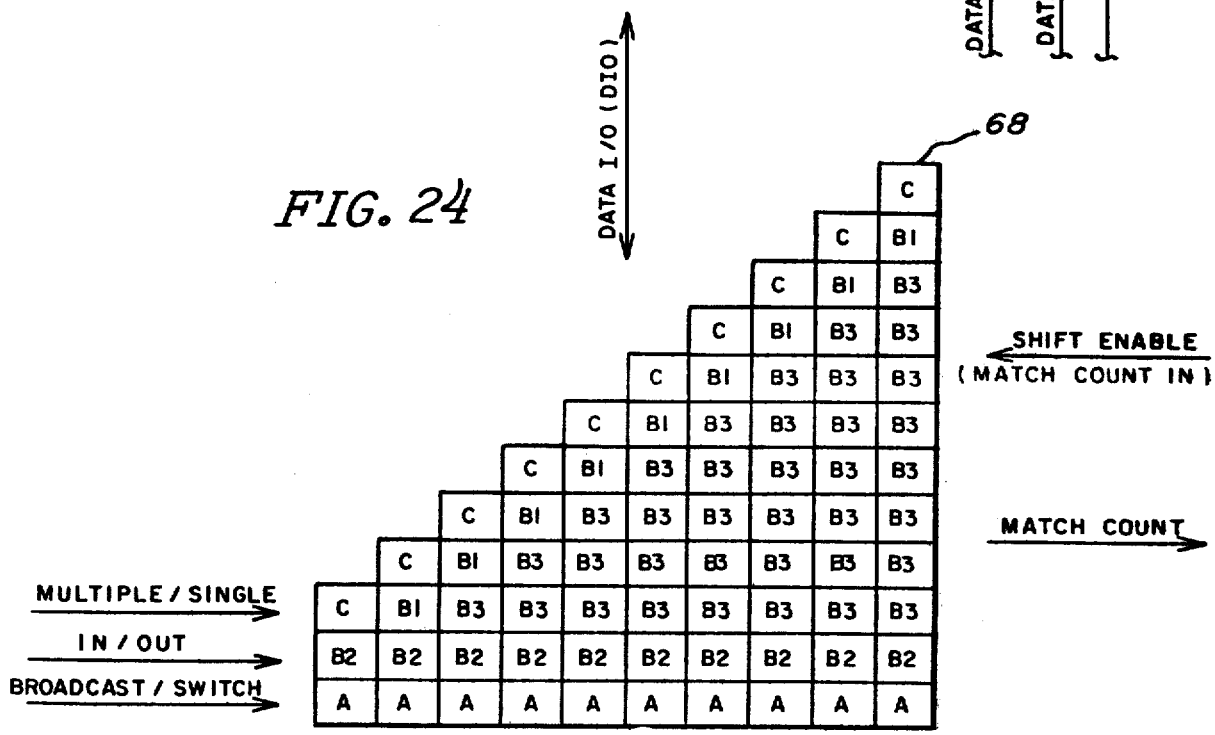
FIG. 24 shows another embodiment of the I/O switch.

FIG. 24 shows a triangular shaped I/O switch which yields a significant saving in complexity and in physical size of a large scale integrated circuit. The shape of the I/O switch is generally similar to that shown in FIGS. 7 and 10. Individual blocks of the I/O switch are designated with various letters: A, B1, B2, B3, or C. These designate different logic blocks contained in the I/O switch. Specific examples of these blocks will be discussed in detail later.

Each I/O switch of the ECAM serves ten word logic blocks. Each word logic block supplies its associated I/O switch with that block's match bit. The same line also connects to the match memory (MM). The I/O switch generates the pointer bit (P) which is part of the multiple match resolver logic. Ten bidirectional word data lines connect the I/O switch to the word logic blocks.

All of the I/O switches of the ECAM are connected to a common I/O port. Conceptually, the ten physical data I/O (PDIO) lines from all switches are ORed together in parallel to form a ten line port. In reality, the ORing is performed in stages at the hybrid, board, and cabinet levels by the buffering logic.

The function code decoding logic supplies each I/O switch with signals which control the operating mode of the switch. The I/O and MMR control logic supplies each I/O switch with shift enables which indicate the number of available data I/O (DIO) lines. In turn, the I/O switch supplies the I/O and MMR control logic with Match Count signals which indicate the number of data I/O lines required by the switch. The I/O switch operation concept is implemented as a triangular matrix which performs two functions: (1) Selection; and (2) Shifting. Participating array words are selected on the basis of the match bits (m). Selected word data I/O (WDIO) lines are connected to logical data I/O lines (LDIO) which are then shifted to physical data I/O lines (PDIO).

The selector matrix is shown in FIG. 25. The matrix is triangular because the first word, if matched, will always connect to the first logical data line. The second word can connect to either of the first two logical data lines, and so on. The selector matrix is controlled by a connection enable signal (CENAB) which propagates in a stairstep fashion through the matrix. Matched words cause the enable to be passed up and to the right on the next level. Non-matched words cause the enable to be passed to the right with no level change. The final level of the enable indicates the number of matches detected by the I/O switch.

The shifter matrix is shown in FIG. 26. The matrix is triangular because the first logical data I/O line may require connection to all ten physical data I/O lines. The second logical data lines can be shifted to only nine of the physical data I/O lines, etc. The shifter matrix is controlled by ten shift enable signals (SENABs) which run diagonally through the matrix. Only one shift enable is energized at a time. The value of the Match Count In controls selection of the proper shift enable. If more than ten responders have been selected by the previous I/O switches, no shift enables will be energized.

The I/O switch is designed to perform four functions: (1) Input; (2) Output; (3) Broadcast; and (4) Output ORing. These functions correspond to the operating modes shown in FIG. 27. Broadcasting is an input mode, and output ORing is, of course, an output mode.

The I/O switch allows both multiple (fast) and single (slow) input. In the multiple input mode, the "first" ten participating (m=1) array words are loaded simultaneously in bit serial fashion from the ten physical data I/O (PDIO) lines. If there are less than ten participating words, then only the participating words will be loaded and unused PDIO lines will be ignored.

In the single input mode, the "first" participating (m=1) array word is loaded in bit serial fashion from the first physical data I/O line (PDIO $\phi$). The remaining PDIO lines will be ignored.

Selection of the "first" one (or ten) participating array words is performed by the I/O and MMR control logic operating in conjunction with the Control Generator Logic tree.

The I/O switch allows both multiple (fast) and single (slow) output. In the multiple output mode the "first" ten participating (m=1) array words are unloaded simultaneously in bit serial fashion onto the ten physical data I/O (PDIO) lines. If there are less than ten participating words, then only the participating words will be unloaded.

In the single output mode the "first" participating (m=1) array word is unloaded in bit serial fashion onto the first physical data I/O line (PDIO $\phi$).

Selection of the "first" one (or ten) participating array words is performed by the I/O and MMR control logic operating in conjunction with the Control Generator Logic tree.

In the broadcast input mode all participating (m=1) array words are loaded simultaneously in bit serial fashion from the first physical data I/O line (PDIO $\phi$). For proper operation of the remaining physical data I/O lines must be either zero or identical to the data on the first PDIO line.

Because the function code decoding logic forces the first shift enable line (SENAB $\phi$) to be "true" when the broadcast mode is used, the I/O and MMR control logic and the Control Generator Logic tree do not affect the operation of the switch during broadcast input.

In the output ORing mode all participating (m=1) array words are ORed simultaneously in bit serial fashion onto the first physical data I/O line (PDIO $\phi$).

Because the function code decoding logic forces the first shift enable line (SENAB $\phi$) to be true when the output ORing mode is used, the I/O and MMR control logic and the Control Generator Logic tree do not affect the operation of the switch during ORing output.

The implementation of the I/O switch is realized by combining the selector and shifter matrices into a common I/O switch matrix with input and output controls. The matrix is constructed with three types of logic building blocks: Type A-Word Logic Interface; Type B-Selector/Shifter; and Type C-Physical Data Interface. The blocks are interconnected as shown in FIG. 24.

Figure 28:
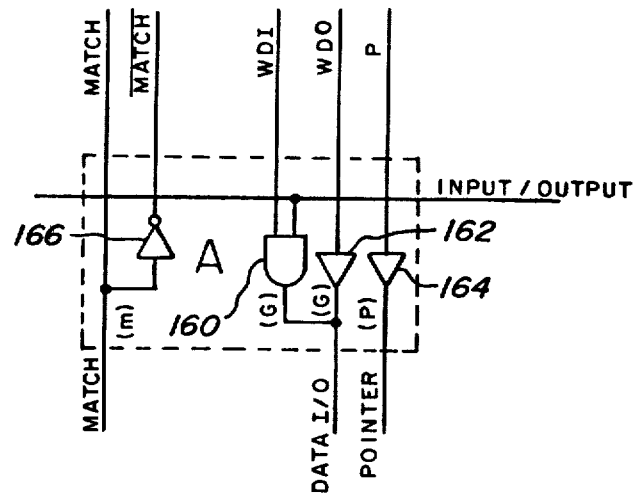
FIGS. 28, 29, 30, and 31 show logic blocks utilized in the I/O switch of FIG. 24.

The word logic interface block (A) shown in FIG. 28 converts the bidirectional data I/O line (G) from a word logic block into two unidirectional word data lines (WDI and WDO) by means of gates 160 and 162. Gate 164 provides buffering for the pointer signal (P) and gate 166 provides inversion of the match bit (m).

Figure 29:
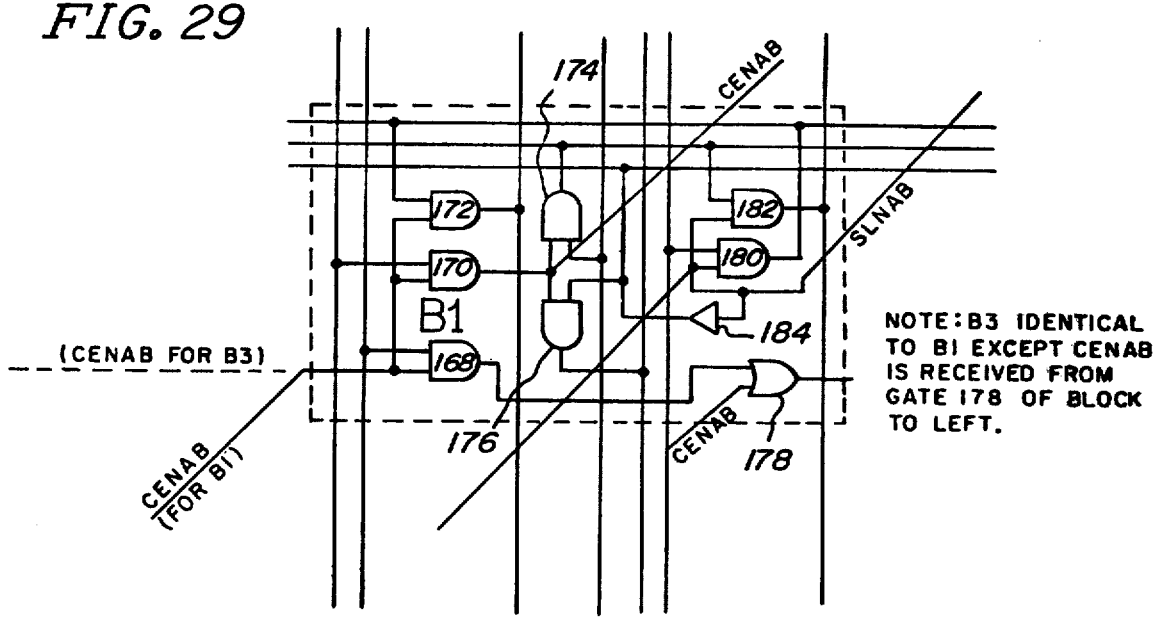
Figure 30:
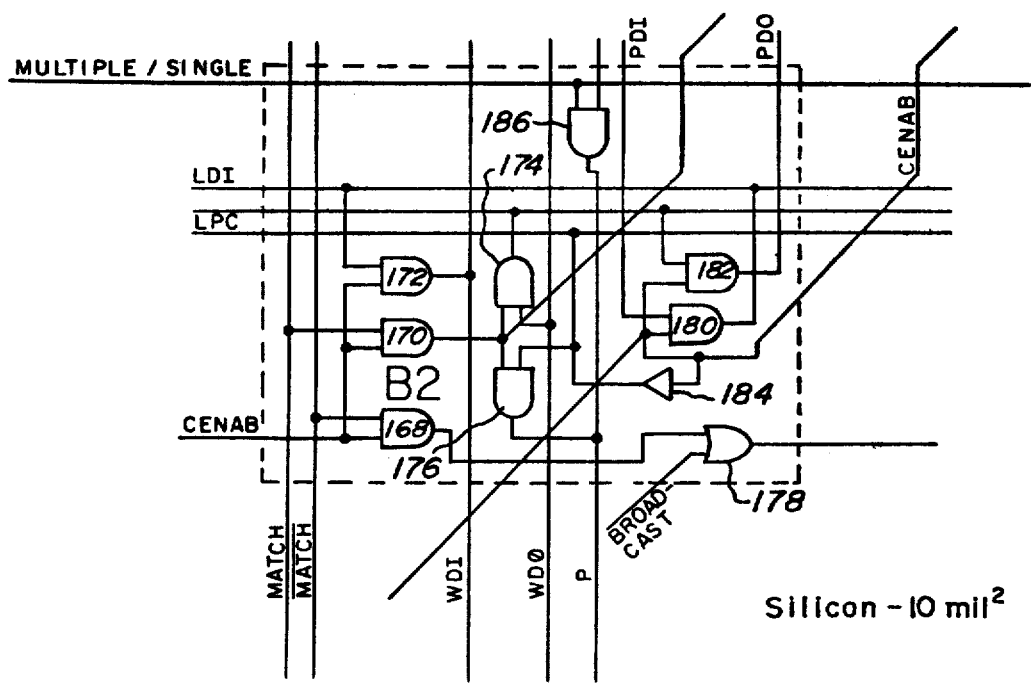

The selector/shifter block (B) exists in three nearly identical forms. Forms B1 and B3 shown in FIG. 29 differ only in the source direction of the leftmost CENAB input. Form B2, shown in FIG. 30, contains an additional gate (186) which effects multiple/single control.

Selection and shifting, through co-located in the Type B blocks, are functionally distinct and operate independently. Selection is accomplished by gates 168 through 178. Gates 168 and 170 are used to control connection between a word and a logical data I/O line. If the word connected to the block has its match bit set (m=1), and the logical data line which passes through the block is the first one available, then the output of gate 170 enables the connection and propagates the enable (CENAB) to the next logical data line (now the first one available). If the match bit is not set (m=0) but the logical data line is available, then the gate 168 propagates the enable to the next block on the same logical data line. Gate 178 combines two connection enable sources for the next block. Gates 172 and 174 make the connection between the word data lines and the logical data lines. Gate 176 generates the P pointer that enables the word itself (match resolution) if a physical data line is available.

Shifting is performed by gates 180 and 182 which connect the logical data lines to the physical data lines when the shift enable (SENAB) line is true (SENAB=1). Driver 184 generates a signal (LPC) indicating that a logical-to-physical connection has been made. This signal is necessary because not all of the words connected to logical data I/O lines may actually be connected to physical data lines by the shifter. The coincidence of match (m), connection enable (CENAB), and LPC generates the pointer signal (P).

In the type B2 block, gate 178 is used to introduce the broadcast/switch control line into the switch matrix. This line, when energized in connection with shift enable zero (SENAB $\phi$), causes the data received as input on the first (left most) physical data line to be broadcast to all active (m=1) word logic blocks. The data received on all the remaining physical data lines must be either zero or identical to the data on the first PDIO line. In the output mode, energizing the broadcast/switch control line in conjunction with shift enable zero (SENAB $\phi$), causes the data supplied by all active (m=1) word logic blocks to be ORed together and applied to the first (leftmost) physical data line (PDIO $\phi$).

Figure 31:
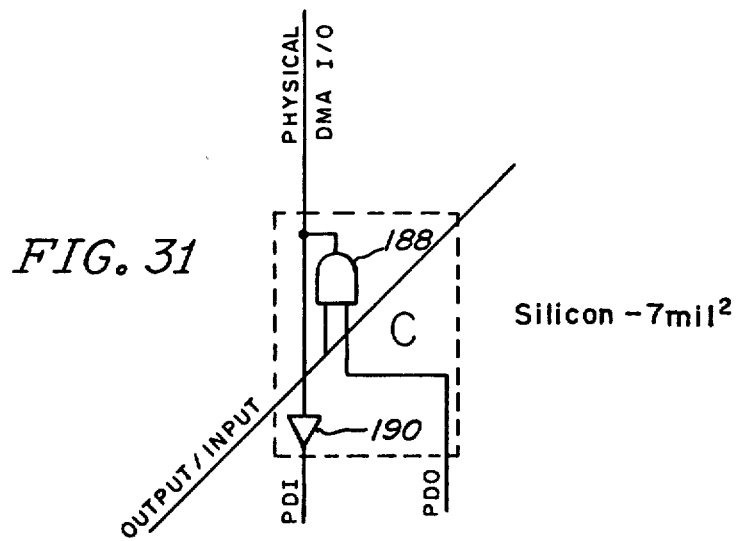

The physical data line interface block (C) shown in FIG. 31 converts the bi-directional physical data I/O line into two unidirectional physical data lines (PDI and PDO). Block C includes gates 188 and 190.

III. D. I/O and MMR Control Logic

Figure 32:
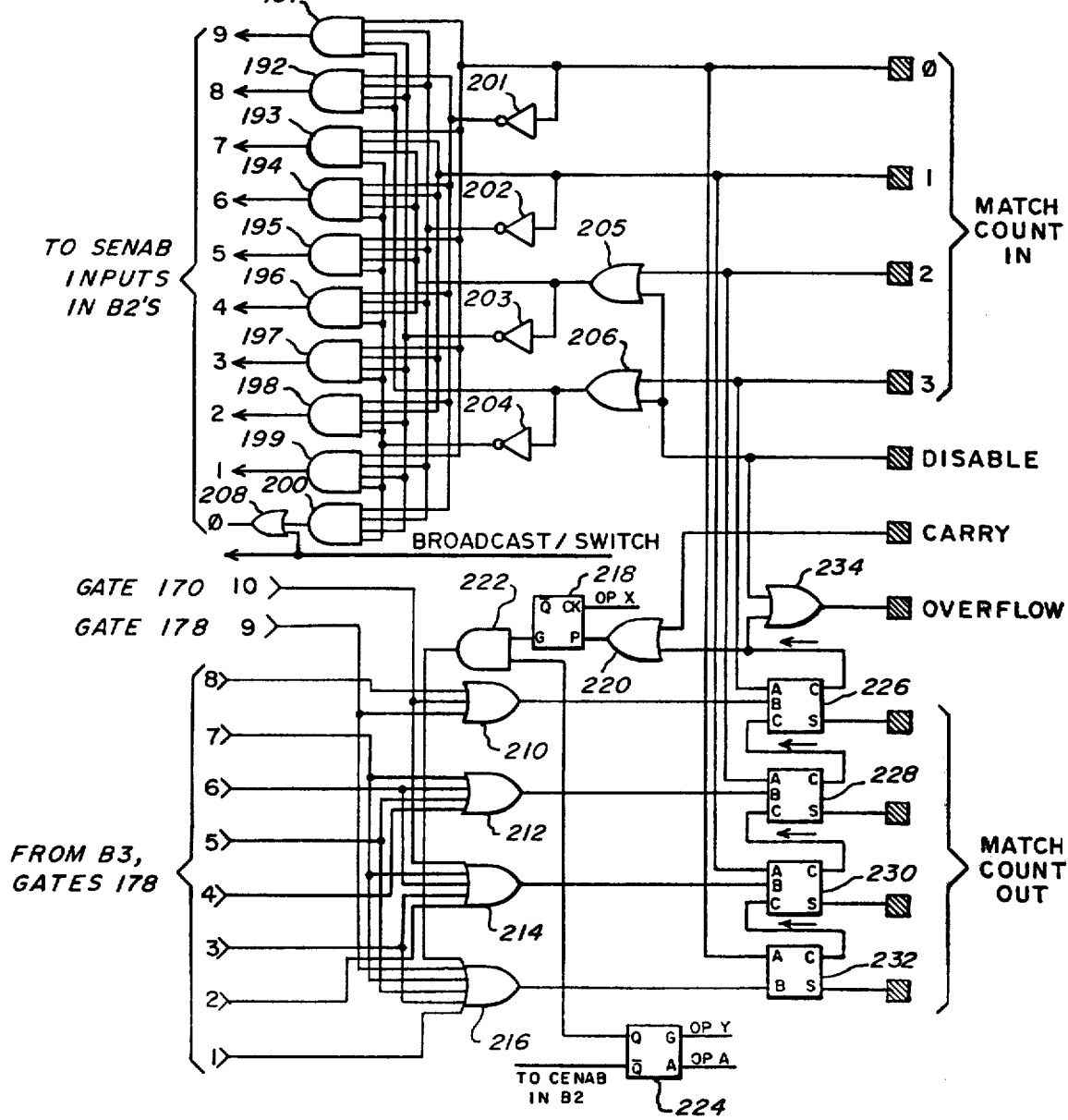
FIG. 32 is a detailed circuit diagram of the I/O and MMR control logic.

The I/O and Multiple Match Resolver control logic shown in FIG. 32 generates control signals for the I/O switch. It also generates and combines match resolver signals in conjunction with the Control Generator Logic tree.

The logical components of the I/O and MMR control logic are a decoder, an encoder, and an adder. The decoder is connected to the Match Count In (MCI) and disable signal lines. Gates 191-207 transform those lines into the ten shift enable (SENAB) lines which control the shifter matrix in the I/O switch. The decoder also provides, with wire-OR gate 208, an input for the Broadcast/Switch signal which is generated by the function code decoder.

The encoder is connected to the final Connection Enable lines (CENABs) in the I/O switch. OR gates 210, 212, 214, and 216 transform those ten lines into four Match Count lines which are inputs to the adder. The encoder also contains the carry flip-flop 218, OR gate 220, AND gate 222, and control flip-flop 224 which are used during responder counting.

The adder adds the value applied to the five Match Count In lines to the match count indicated by the encoder outputs. The sum is the Match Count Out. The adder consists of three full adder circuits 226, 228 and 230; half adder 232; and OR gate 234.

The I/O and Multiple Match Resolver control logic controls the I/O switch during the following operations: (1) Input/Output, (2) Multiple Match Resolution, and (3) Responder Counting. During input/output and multiple match resolution, the I/O and MMR control logic decoder transforms the MODULO 16 plus overflow representation of the number of responders "above" the controlled I/O switch into shift enables (SENABs) which result in the connection of logical data lines to unused physical data lines.

Meanwhile, the encoder converts the connection enable signals (CENABs), which indicate the number of responders detected by the controlled I/O switch, to a binary representation which is used by the adder to compute the number of responders detected including the particular word logic chip.

During responder counting the encoder first presents the number of detected responders to the adder for accumulation. After the slave controller has received the MODULO 16 result, the adder carrys are captured by the capture flip-flop in each encoder. The control flip-flop is then set causing the encoder to present the number of carrys ($\phi$ or 1) to the adder for accumulation. Carrys are captured and accumulated until no overflow exists at the slave controller. With each iteration, four bits of responder count value are recorded at the slave controller.

III. E. Function Code Decoding Logic

Figure 33:
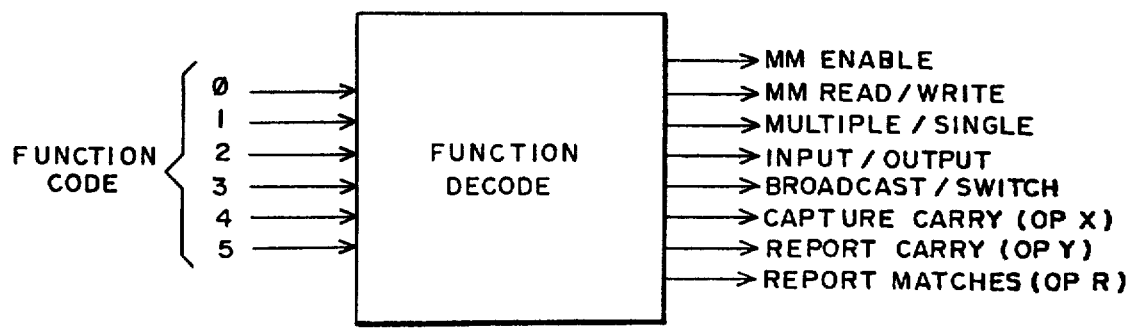
FIG. 33 shows the function code decoding logic.

The function code decoding logic 72, shown in FIG. 33, is a combinatorial logic block which generates specific control signals required on the word logic chip. Its function is analogous to that of the function code decoding portion of the word logic block.

IV. Detailed Hybrid Level Description

Figure 34:
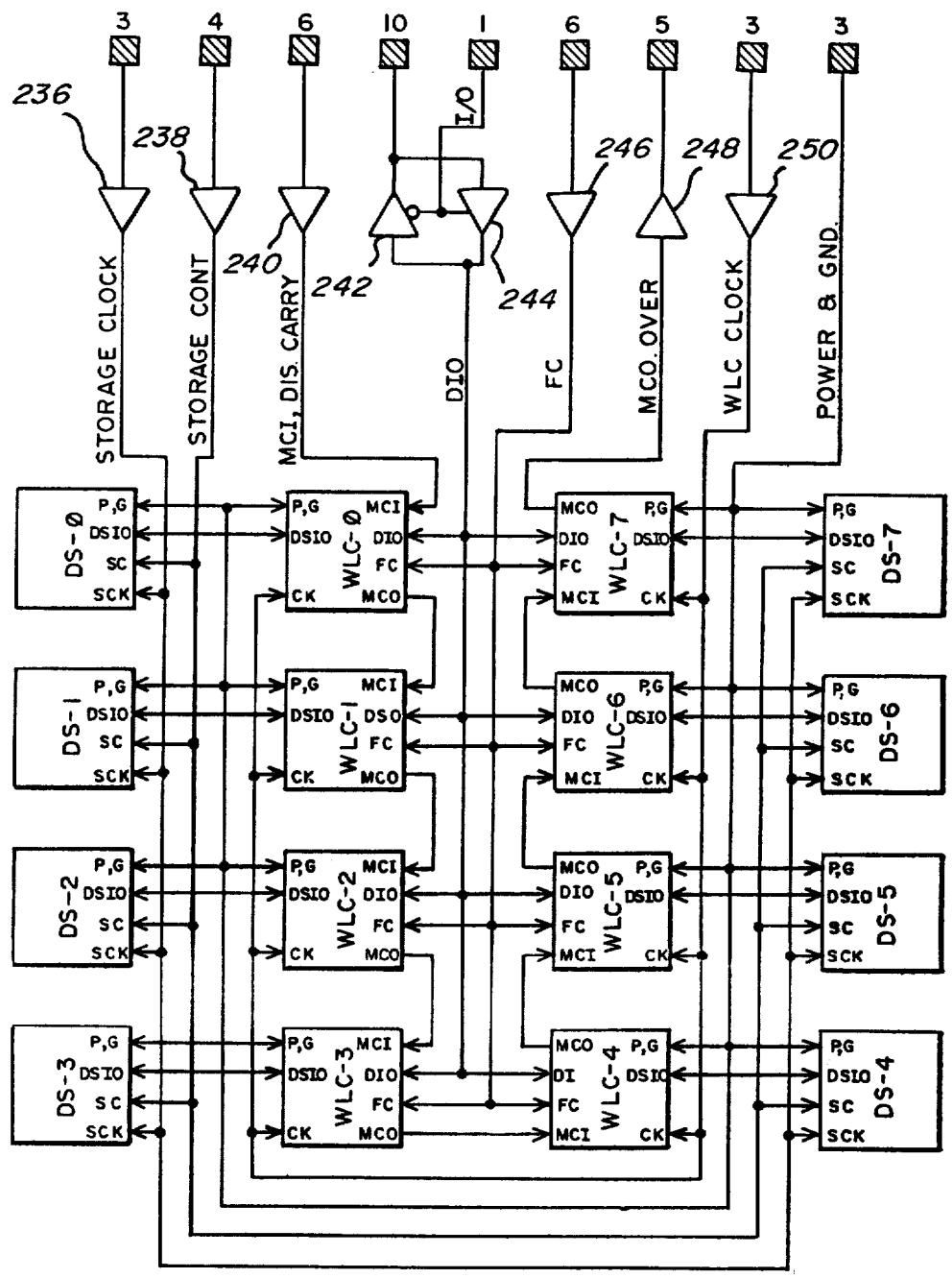
FIG. 34 shows the ECAM hybrid circuit module.

The organization of a hybrid circuit module is presented in FIG. 34. The components and their interconnection are discussed first. Then the operation of the hybrid during certain array operations is described.

Each hybrid circuit module contains eight word logic chips (WLC) 60a–60h and data storage chips (DS) 46a–46h arranged in pairs. Thus, a single module provides eighty (80) ECAM array words. The module also contains signal buffering circuits 236, 238, 240, 242, 244, 246, 248 and 250, which are standard, commercially available, devices. In addition to the usual power and ground distribution, the hybrid circuit module contains interconnections for clock, data, and control.

Two clock distributions are provided. The three storage clock lines serve the data storage chips. A separate set of three clock lines is used by the word logic chips (WLC Clocks). Ten bi-directional data I/O lines (called PDIO in the I/O switch) are wire-ORed from each word logic chip. Bi-directional buffers (transceivers) are used at the hybrid connector pins. Control of the data storage chips is supplied by four storage control lines which are connected directly to those chips. Function control of the word logic chips is supplied by the six function code (FC) lines.

I/O switch and multiple match resolver control is both supplied to and generated in the hybrid circuit module. The hybrid interface (HIF) circuits within the control generator logic tree (board level) supply the Match Count In, Disable and Carry control signals to the hybrid. Additionally, each word logic chip generates four Match Count Out signals and a Disable signal which are connected to the next chip. The outputs from the last chip are supplied to the Control Generator Logic tree.

The hybrid circuit module employes function control signals and I/O/MMR control signals. Function codes (FC) applied to each word logic chip control both the actions performed by the word logic blocks, and also the operating mode of the I/O switch. These functions have been previously described. The I/O/MMR control signals are supplied by the Control Generator Logic tree (board level). They consist of Match Count In, Disable, and carry In. The controls support the operations of Input/Output, multiple match resolution and responder counting.

The Match Count In is four lines which are binary coded to represent the number of responders which have been detected "above" the work logic chip to which the count is applied. The I/O switch will not connect a word logic block to an I/O line when the match count in is greater than ten (10). Each word logic chip adds the number of responders (m=1) it detects to the Match Count In to produce the Match Count Out. The Match Count Out becomes the Match Count In of the next word logic chip. The final Match Count Out informs the control generator logic tree of the number of matches detected by the hybrid. Match Count In to a hybrid and Match Count Out from a hybrid are not used simultaneously. The Match Count In signal to a hybrid is not used during the responder count operation.

The Disable control signal is generated (by the control generator logic tree or by a word logic chip) when the accumulated Match Count exceeds fifteen (15). Once generated, the Disable control signal is propagated to the end of the array. This signal is necessary because the match count lines contain the result of MODULO 16 additions. The Disable control signal prevents an I/O switch from connecting any of the word logic blocks it serves to any of the physical data I/O lines. The Disable signal is not used during the responder count operation. During the responder count operation, the Carry In signal to the hybrid indicates that a carry has occurred in the control generator logic tree. The carry will be captured in the first word logic chip and counted on the next iteration. The Carry In pin of each of the remaining seven word logic chips in the hybrid is forced to a logic zero. Adder carrys in those chips will be captured within each chip. The Carry In signal is ignored during input/output and multiple match resolution operations.

V. Detailed Board Level Description

Figure 35:
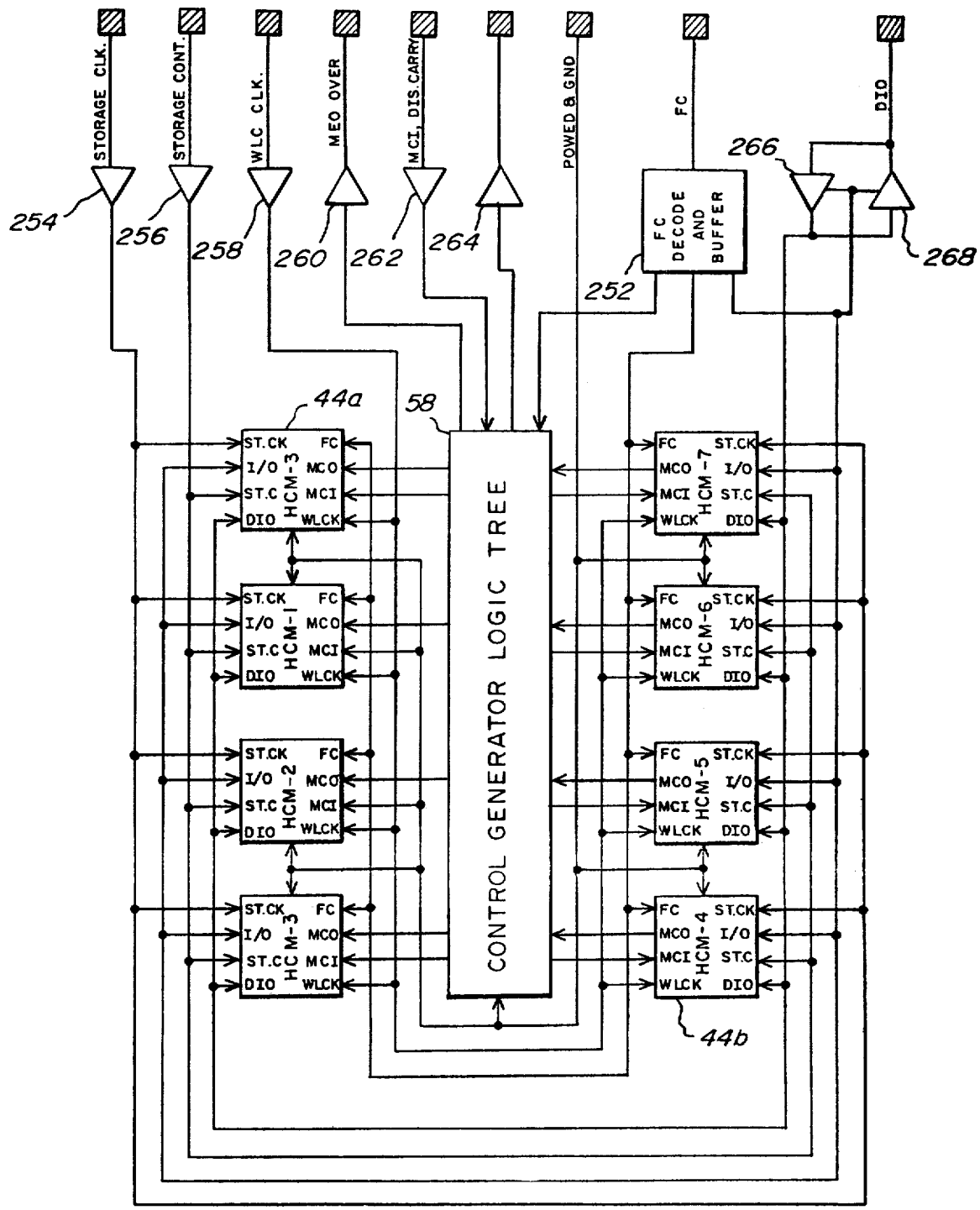
FIG. 35 shows the ECAM array circuit board.

The organization of an array circuit board is presented in FIG. 35. Each array circuit board contains eight hybrid circuit modules (HCM) 44a–44h, a Control Generator Logic tree 58, function code decoding and buffering 252, and interconnect signal buffers 254, 256, 258, 260, 262, 264, 266, and 268. One circuit board comprises the storage, processing, and control hardware for 640 array words (each 4096 bits in length).

Each hybrid circuit module contains eighty (80) data storage words and eighty (80) word logic blocks (processing elements). The construction and operation of the hybrids has been discussed in the previous section.

Figure 36:
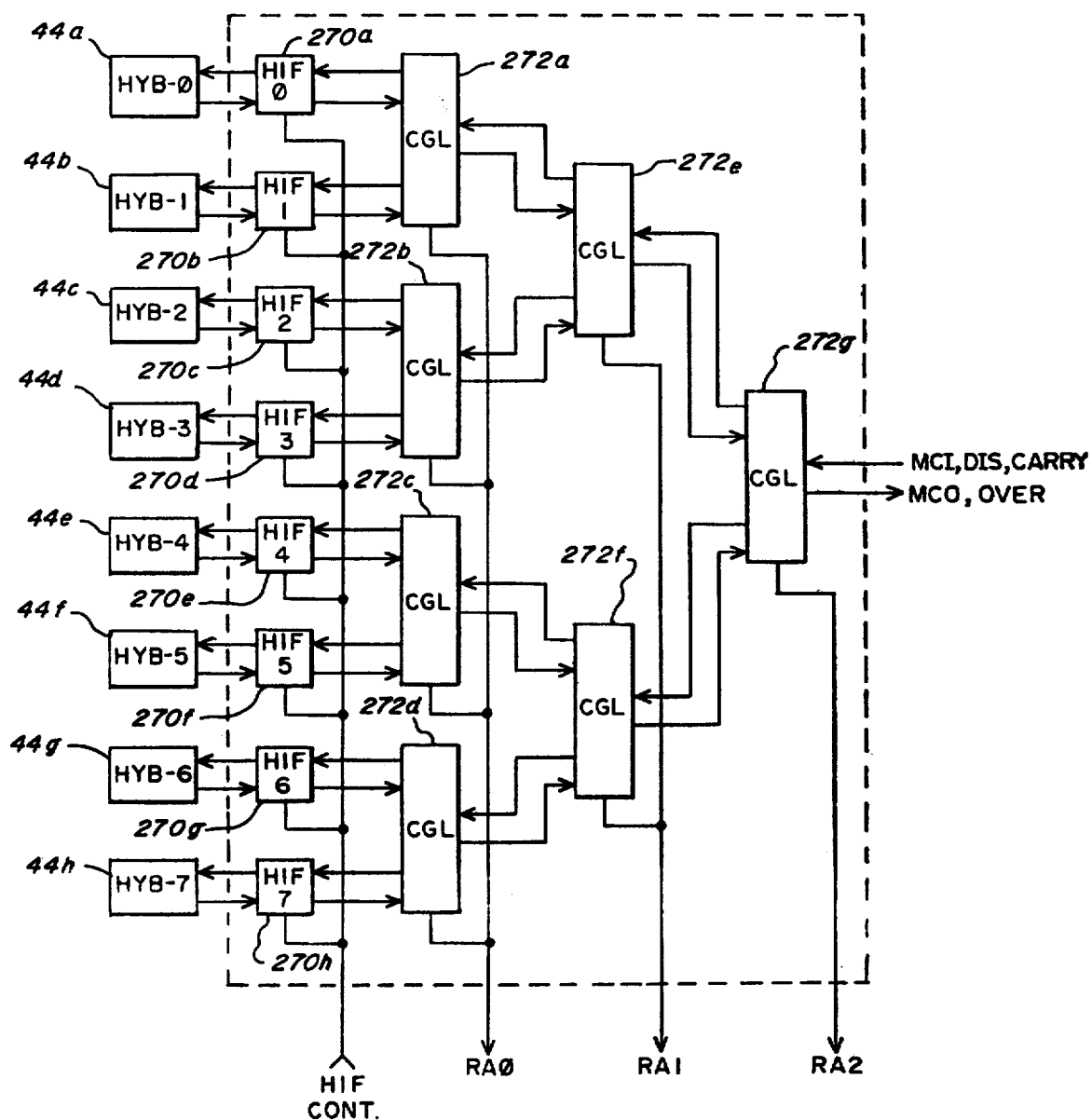
FIG. 36 illustrates the ECAM control generator logic tree.

The Control Generator Logic tree, shown in detail in FIG. 36, is constructed of approximately 43 standard TTL logic devices. It controls the operation of the I/O switches and provides the multiple match resolution capability. It also generates responder address signals which identify the first hybrid circuit module which contains a participating (m=1) array word.

The function code decode and buffering logic 252 is a read-only memory (ROM) or programmable logic array (PLA) which generates board and hybrid level control signals based on the function code (FC) lines. This logic also serves as a buffer for those lines and thereby aids signal distribution.

The interconnect signal buffering 254–264 reduces the signal load requirement created by the card. It also increases the drive and ORing capability of signals leaving the card.

In addition to the usual power and ground distribution, the array circuit board contains interconnections for clock, data, and control. Two identical clock distributions are provided. Each consists of a set of three lines and each is connected to the hybrid circuit modules. One set serves the data storage chips while the second serves the word logic chips.

Ten bi-directional data I/O lines are wire- ORed from each hybrid circuit module. Bi-directional buffers (transceivers) 266 and 268 are used at the card connector pins.

Control of the data storage chips within the hybrid circuit modules is supplied by four storage control lines which are connected to each hybrid. Function control of the word logic chips is supplied by six function code (FC) lines which are also connected to each hybrid. The function code decoding logic 252 generates an I/O control line which is used by the hybrids and the data transceivers. In addition, function code decoding logic 252 produces two controls for the hybrid interface logic within control generator logic tree 58, and buffers the six function codes before they are applied to the hybrids. I/O switch and multiple match resolver control signals are created within Control Generator Logic tree 58 and applied directly to each hybrid. Eleven control signals (six in and five out) are used to connect the circuit board to the more global levels of the tree (cabinet buffers, etc.). The responder address lines (3) which originate in the Control Generator Logic tree are sent to the card connector for combination with signals from other cards and used by the slave controller.

Control Generator Logic tree 58 deserves additional discussion. In the following paragraphs, the structure of the tree is presented first, then the overall operation is described, and finally, the operation of the individual components is explained. The structure of the control generator logic tree is evident in FIG. 36. It includes eight hybrid interface (HIF) circuits 270a-270h and seven control generator logic (CLC) blocks 272a-272g.

Packaging constraints require that the number of chips contained in each hybrid circuit module be minimized. The tree structure, therefore, is not continued within the hybrids. Instead, a ripple technique is used to control the I/O switches within the hybrid. The result of this break in the uniformity of the tree structure is that hybrid interface circuits (HIF) 270a-270h are required. These circuits consolidate the operational differences that exist between the tree structure and the ripple structure.

Identical building blocks (control generator logic blocks 272a-272g) are used to implement the branch nodes of the tree. The tree structure is continued by interconnecting array circuit boards to similar logic on the cabinet buffer boards and at the subsystem level. The logic at the subsystem levels is merely a continuation of the tree structure.

The base of the tree is connected to the slave controller. It indicates the MODULO 16 count of the number of active (responding) array words. The tree also supplies the slave controller with the address of the first responding hybrid. The address lines (RA$\phi$, RA1, . . . , RAn) are wire-ored across array circuit boards.

The Control Generator Logic tree provides control environment for the hybrid circuit modules. The operations controlled by the tree include: (1) I/O Preparation and Multiple Match Resolution, (2) Responder Counting, and (3) Responding Hybrid Address Generation.

The result of the I/O preparation and Multiple Match Resolution operation is the selection of one array word or a set (maximum ten) of array words. The word (or words) selected is the first of the matched (m=1) words of the array. While the actual selection is performed by the I/O switches, the selection is based on the outputs of the Control Generator Logic tree.

The tree receives a match count from each hybrid indicating the number of matched array words within the hybrid. The tree combines the match counts to produce a series of partial sums, one for each hybrid. A partial sum (called Match Count In) indicates to a hybrid the number of matched words which have been detected in previous hybrids. The partial sums are represented MODULO 16 with an overflow indication.

During I/O preparation, either one or a set (maximum 10) of words is selected. This is controlled by the multiple/single control derived from the function code (FC). During multiple match resolution usually one word (the first) is selected again using the multiple/single control. The two functions are the same. Only the objective may be considered different.

The tree structure is fully combinatorial and does not, if fully implemented, require a sequence of operations to reach its final state. However, because the tree is not implemented within the hybrid circuit modules (a packaging restriction), and because the hybrids do not follow the interconnection rules of the tree, a two step operating sequence is required.

First the hybrid interface registers are cleared. This causes the Match Count In of each hybrid to equal zero. The hybrids will each simultaneously accumulate their own match count sum by ripple adding the count of each word logic chip. When the sums reach the match count out lines of each hybrid, the tree begins generating partial sums by employing a hierarchial adding technique. When the partial sums are present at the inputs of the hybrid interface registers the first operating step is complete.

As the second step, the hybrid interface registers are loaded with the partial sums generated by the tree. This causes each Match Count In to equal the sum of the previously supplied match count out values, or $$MCI_m = \sum_{i=0}^{n-1} MCO_i$$

The hybrids will then simultaneously accumulate new partial sums internally until the Match Count In of each word logic chip is correct. The final Match Count Out of the hybrid will be supplied to the control generator tree, but is not used. The object of the Responder Counting operation is to inform the slave controller of the total number of matched (m=1) words within the array. The counting is performed by an iteration process that produces four (4) bits of result at the slave controller with each iteration.

To initialize the array, the hybrid interface registers are first cleared. This causes the Match Count Out generated by each hybrid to indicate the MODULO 16 representation of the number of matched words within the hybrid. The tree combines the match count in successive stages until a four bit result is produced at the base of the tree. The four bits represent the least significant four bits of the responder count. If the overflow signal at the base of the tree is zero, the counting is complete.

In the summing process, carrys are generated at each point in the tree where the sum exceeds fifteen. These carrys are propagated back toward the hybrids. The "capture carry" function code causes the carrys to be latched in flip-flops in the hybrids. Tree generated carrys are captured in the first word logic chip of a hybrid. Carrys which are generated within the ripple adder structure of a hybrid are simultaneously captured in the seven remaining word logic blocks in each hybrid.

After the carrys have been captured, the "report carrys" function in executed. This function code disables the I/O switch so that it does not detect matches. The carry capture flip-flop then presents its value (1 or $\phi$) to the adder. A MODULO 16 sum of carrys is then generated by the adders and may be removed by the slave controller at the base of the tree. This sum represents the next four bits (more significant than the previous four) of the responder count. If the overflow signal at the base of the tree is zero, the counting is complete. If not, carrys are again captured and another four bits of sum are generated.

When the counting is complete, the "report matches" function is executed. This restores the I/O switch to its normal match detecting state. Because four bits of sum are generated with each iteration, no more than $I = (-\log_2 N)/4$ iterations are required when N is the number of responders (matches) and I is rounded upward to an integer value.

During I/O preparation and multiple match resolution, the control generator logic tree indicates, in binary, the physical address of the hybrid circuit module which contains the first responding (m = 1) array word. The address is present on the responder address lines ($RA_0, RA_1, \ldots, RA_n$) after the hybrid interface registers have been cleared but before they are reloaded.

Figure 37:
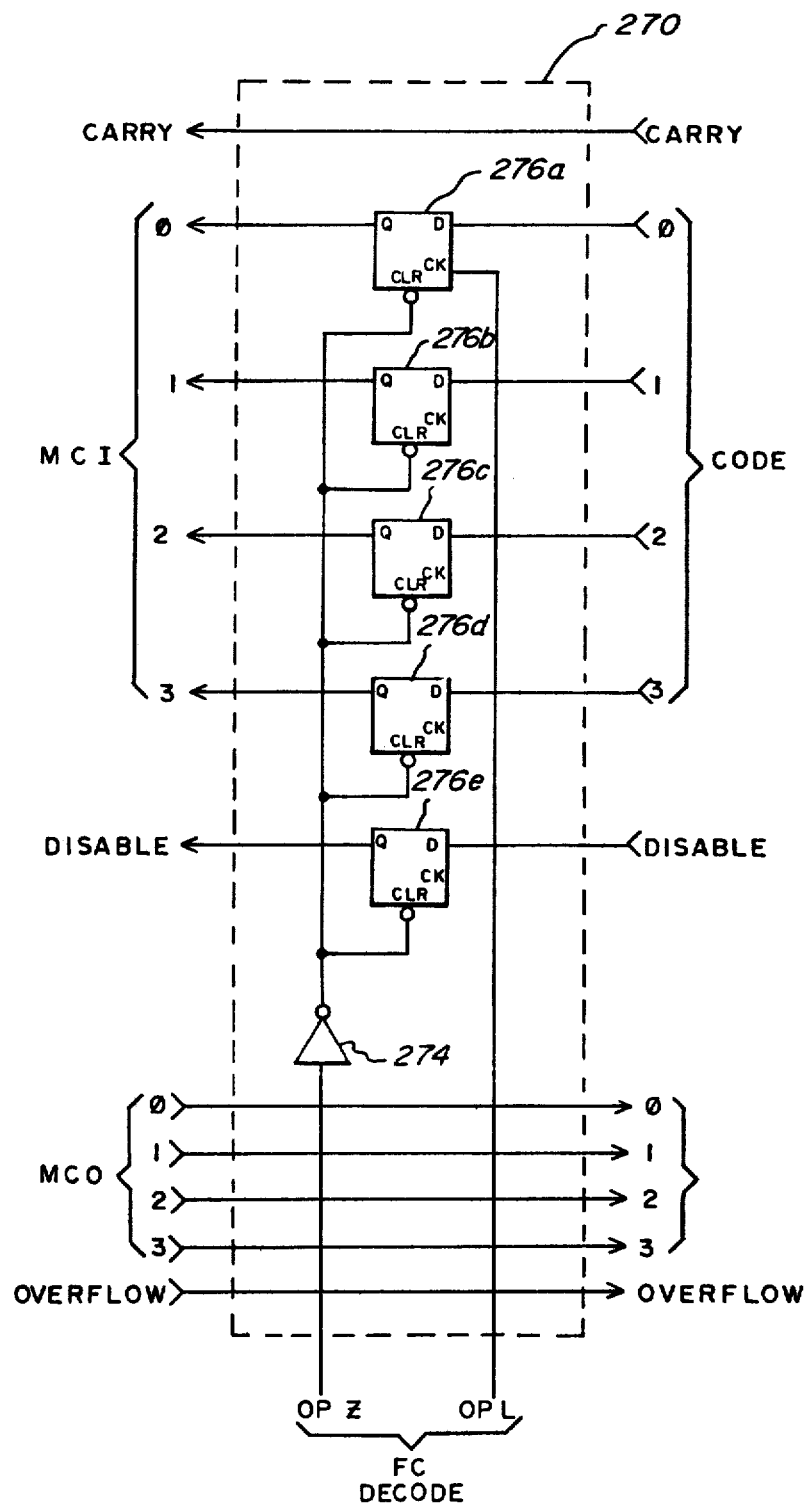
FIG. 37 is a circuit diagram of a hybrid interface block (HIF).

The hybrid interface consolidates the operating differences between the control generator logic tree and the hybrid circuit modules. One hybrid interface block (HIF) 270 is shown in FIG. 37.

When the "zero hybrid interface register" function code (OP Z) is executed, it is applied through inverter 274 to all hybrid interface flip-flops 276a–276e, which are thereby cleared. When the "load hybrid interface register" function code (OP L) is executed, all hybrid interface flip-flops 276a–276e are simultaneously loaded with the code value supplied by the control generator logic tree.

Figure 38:
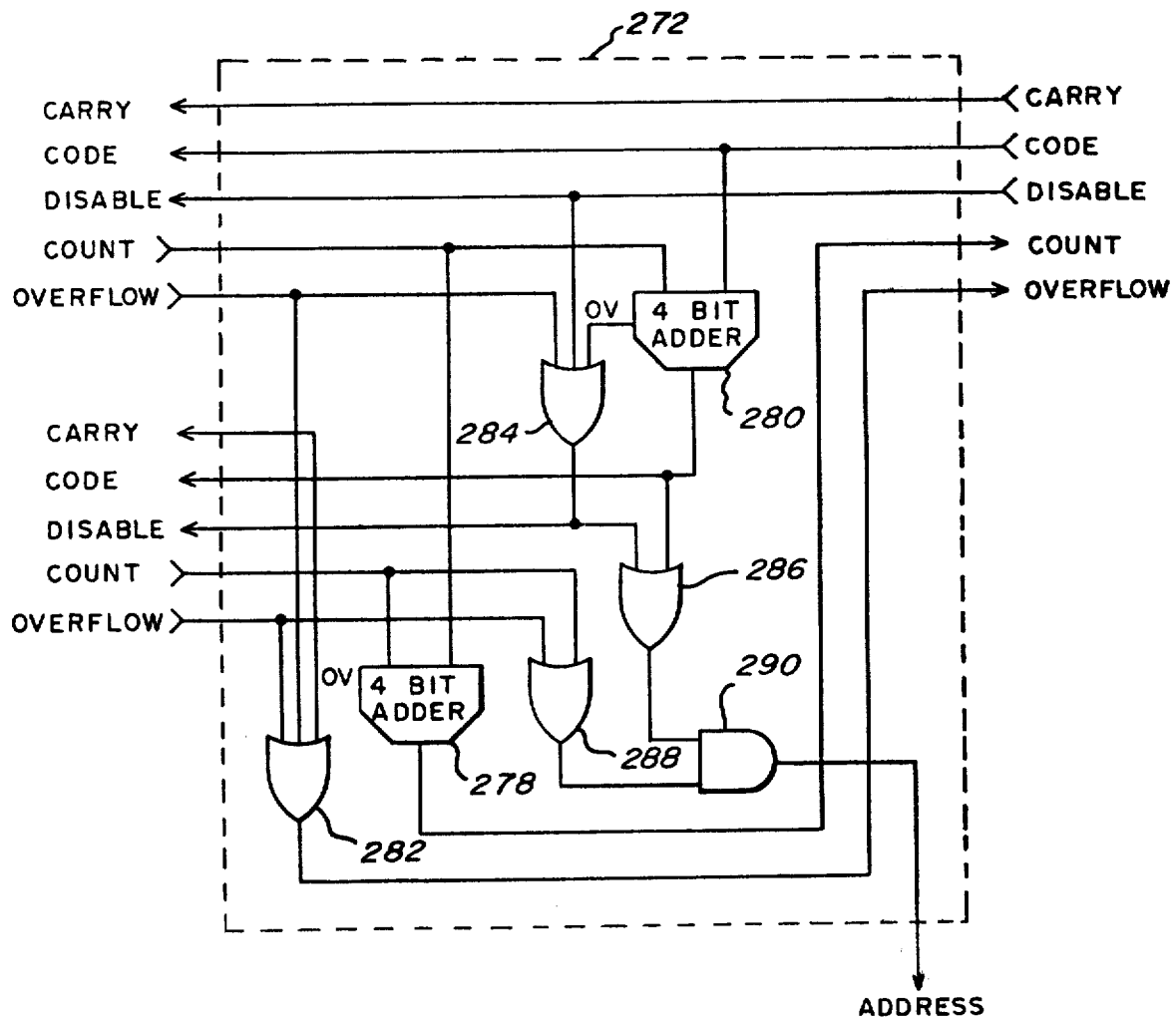
FIG. 38 shows an ECAM control generator logic block.

FIG. 38 shows the control generator logic block 272, which is the basic unit of the control generator logic tree. Each block connects to one block on the right (trunk or base side) and to two blocks on the left (leaf side).

The block contains two adders 278 and 280 and two OR gates 282 and 284 which are used for most functions. Adder 278 and gate 282 combine the match counts and overflows from two sources (blocks or hybrids) and pass the result to the right. An overflow from adder 278 constitutes a carry which is passed to the hybrids for capture during responder counting. Adder 280 and gate 284 combine the match count and overflow from the upper source with the code and disable from the block on the trunk side to produce code and disable signals for the block or hybrid to the lower left (leaf side). The code and disable signals contain partial sum information like the count and overflow signals, but they propagate toward the leaves rather than toward the trunk of the tree. At the base (trunk) of the tree the carry, code and disable lines are hardwired to zero.

The three remaining gates 286, 288, and 290 detect the occurrence of no responses above with one or more responses below. This serves as a binary responder address line. All responder address lines generated at the same tree level are ORed together.

VI. Detailed Cabinet Level Description

Figure 39:
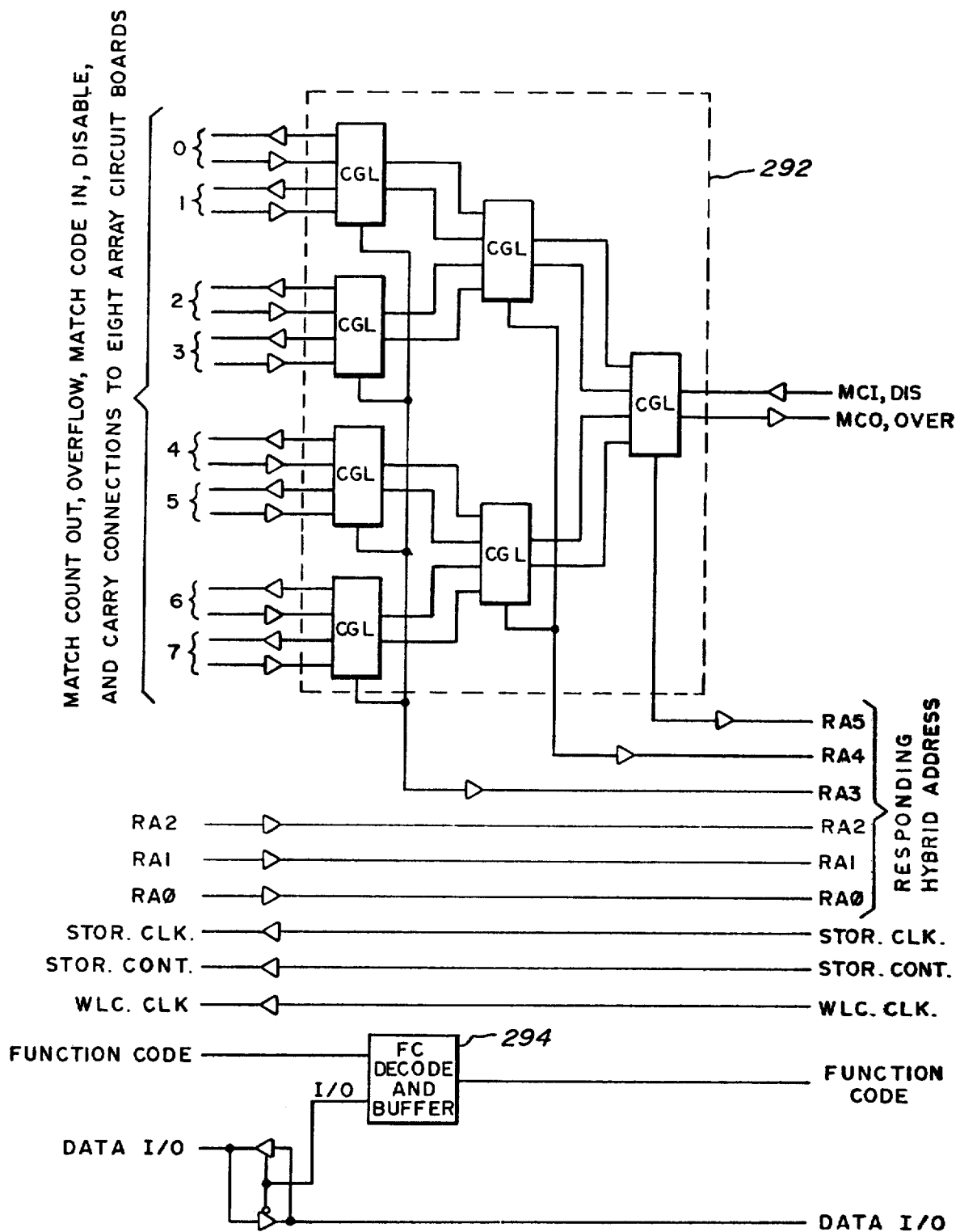
FIG. 39 shows an ECAM cabinet buffer board.

Each ECAM array cabinet contains cabinet buffer board which provides signal buffering and holds the cabinet level portion of the control generator logic tree. This board is shown in FIG. 39.

Each cabinet buffer board contains a control generator logic tree 292, function code decoding and buffering 294, and interconnect signal buffering. Each buffer board serves eight array circuit boards by providing continuation of the control generator tree and buffering of the control and data signals. While the cabinet buffer logic is preferably a single printed circuit board, it could easily be partitioned into two boards if necessary.

The Control Generator Logic tree 292 on the cabinet buffer board continues the tree structure from the array circuit board level. The tree connects to eight array circuit board trees to continue the control generation scheme. The tree is identical in structure to the array circuit board trees, but requires no hybrid interface circuits. The tree also generates three additional bits of responder address ($RA_3, RA_4, RA_5$).

The function code decoding and buffering logic 294 is a read-only memory (ROM) or programmable logic array (PLA) which generates the input/output control signal based on the function code (FC) lines. This logic also serves as a buffer for those lines, and thereby aids signal distribution.

The interconnect signal buffering reduces the signal load requirement created by the cabinet. It also increases the drive and ORing capability of signals entering or leaving the cabinet.

The cabinet buffer board has two functions, signal buffering and cabinet level control. The interconnect signal buffering permits the electrical requirements of the logic circuits to be met. Buffering of signals occurs in both the array-bound and the slave-bound directions. It also increases the drive and ORing capability of signals leaving the card or cabinet.

Cabinet level control is established by the Control Generator Logic tree 292 on the cabinet buffer board. At this level the tree computes MODULO 16 sums across cards and generates carrys for use in the responder count iterations. The tree detects the card containing the first responding hybrid and identifies that card with three responder address bits. Control Generator Logic tree 292 also accepts cabinet-to-cabinet MODULO 16 sums at its base in order to allow each cabinet to be integrated into the total system.

VII. Conclusion

The elements of the ECAM associative array have been discussed in detail. Word logic blocks provide each storage word with a processing capability that supports associative array functions. A random access "Match" memory supplies the word logic blocks with a workspace for intermediate result storage during evaluation of complex search expressions. A unique switch mechanism enables high speed input and output. The I/O switch combines with a tree structured control scheme to perform multiple match resolution and responder counting. A hierarchy of signal distribution and buffering is mated with the Control Generator Logic tree to take advantage of the various packaging techniques and thereby assure an easily implemented and realizeable array structure.

Although the invention has been described with reference to preferred embodiments, workers skilled in the art will recognize that changes may be made in form and detail without departing from the spirit and scope of the invention.

The embodiments of the invention in which an exclusive property or right is claimed are defined as follows:

1. A data switching system having the internal capacity to selectively connect each of a plurality of input/output lines on one side of the system to any one of a plurality of available input/output lines on another side of the system, said system comprising:
   N word input/output lines where N is greater than 1;
   M data input/output lines where M is greater than 1 and $M \leq N$;
   request means for selecting n word input/output lines for data transfer, where $0 \leq n \leq N$;
   switching means for connecting each of the n selected word input/output lines to one of n data input/output lines to permit parallel data transfer, said switching means comprising an array of switching circuits having N rows and M columns with each switching circuit being positioned at the intersection of each row and column and where the word input/output and request signals are connected to one end of the switching circuits of each row, and the data input/output lines are connected to one end of the switching circuits of each column;
   enable means for indicating to the switching means the identity of the first data input/output line to which one of the word input/output lines may be connected, said enable means being connected to one end of the switching circuits of each column;
   means for propagating a request signal along a row until the request signal reaches a switching circuit intersection at which the enable signal is present;
   means for propagating the enable signal along a column until it reaches an intersection at which a request signal is present; and
   means for connecting a word input/output line and the data input/output line corresponding to the switching intersection at which the enable signal and a request signal are present.

2. The invention as claimed in claim 1 wherein each switching circuit comprises:
   means for propagating the enabling signal diagonally from the switching circuit to a switching circuit at the next row and column in the event that the enable signal and a request signal are present at the switching intersection associated with switching circuit.

3. A memory system comprising:
   N word storage means where N is greater than 1;
   N word input/output lines connected to the N word storage means;
   M data input/output lines for transmitting data to or from the memory system;
   request means for providing request signals indicative of the word input/output lines selected for data transfer;
   control logic means for providing an enable signal indicative of the identity of the first available data input/output line to which one of the selected word input/output lines may be connected;
   switching means comprising an array of switching circuits connected to the N word input/output lines and the M data input/output lines for receiving the request signals and the enable signal and connecting the selected word input/output lines to data input/output lines to permit parallel data transfer; said array of switching circuits comprising:
   word interface logic circuit blocks connected to the word input/output lines;
   data line interface logic circuit blocks connected to the data input/output lines; and
   a matrix of connection circuit blocks for connecting the selected word input/output lines to data input/output lines, the matrix being connected between the word interface logic circuit blocks and the data line interface logic circuit blocks.

4. The memory system of claim 3 wherein each connection logic block comprises:
   means for propagating a request signal along a row until the request signal reaches a switching intersection at which the enable signal is present;
   means for propagating the enable signal along a column until it reaches an intersection at which a request signal is present;
   means for connecting the word input/output line and the data input/output line corresponding to the switching intersection at which the enable signal and a request signal are present; and
   means for propagating the enable signal diagonally to the next row and column in the event that the enable signal and a request signal are present at the switching intersection.

5. The memory system of claim 3 wherein the switching means generates a Match Count signal indicative of the number of data input/output lines required by the switching means.

6. The memory system of claim 5 wherein the control logic means receives a Match Count In signal and wherein the enable signal indicative of the identity of the first available data input/output line is a function of the Match Count In signal.

7. The memory system of claim 6 wherein the control logic means receives the Match Count signal from the switching means and provides a Match Count Out signal which is a function of the Match Count In signal and the Match Count signal from the switching means.

* * * * *